US008162735B2

(12) United States Patent
Walker et al.

(10) Patent No.: US 8,162,735 B2
(45) Date of Patent: Apr. 24, 2012

(54) METHOD AND APPARATUS FOR OUTPUTTING OUTCOMES OF A GAMING DEVICE

(75) Inventors: Jay S. Walker, Ridgefield, CT (US); James A. Jorasch, Stamford, CT (US); Magdalena M. Fincham, Norwalk, CT (US); Russell P. Sammon, San Francisco, CA (US); Scott T. Friesen, New York, NY (US)

(73) Assignee: IGT, Reno, NV (US)

( * ) Notice: Subject to any disclaimer, the term of this patent is extended or adjusted under 35 U.S.C. 154(b) by 1191 days.

(21) Appl. No.: 11/942,014

(22) Filed: Nov. 19, 2007

(65) Prior Publication Data

US 2008/0070669 A1 Mar. 20, 2008

Related U.S. Application Data

(63) Continuation of application No. 10/328,116, filed on Dec. 20, 2002, now Pat. No. 7,467,999.

(60) Provisional application No. 60/373,751, filed on Apr. 18, 2002.

(51) Int. Cl.
*G06F 17/00* (2006.01)

(52) U.S. Cl. ............................................ 463/16; 463/31

(58) Field of Classification Search ..................... 463/20
See application file for complete search history.

(56) References Cited

U.S. PATENT DOCUMENTS 3,810,627 A 5/1974 Levy
3,909,002 A 9/1975 Levy
4,669,731 A 6/1987 Clarke
4,679,143 A 7/1987 Hagiwara
4,766,539 A 8/1988 Fox
4,826,169 A 5/1989 Bessho
5,074,559 A * 12/1991 Okada ............................ 463/21
5,178,390 A 1/1993 Okada
5,179,517 A 1/1993 Sarbin
5,320,356 A 6/1994 Cauda
5,382,025 A 1/1995 Sklansky et al.
5,417,430 A 5/1995 Breeding (Continued)

FOREIGN PATENT DOCUMENTS

EP 1 184 822 3/2002

(Continued)

OTHER PUBLICATIONS

Regan, Jim, "Winning At Slot Machines", A Guide To Making Money At The Most Popular Of All Casino Games, Carol Publishing Group Edition, 1997.

(Continued)

*Primary Examiner* — Melba Bumgarner
*Assistant Examiner* — Tramar Harper
(74) *Attorney, Agent, or Firm* — K&L Gates LLP

(57) ABSTRACT

In accordance with one or more embodiments, a method for outputting an outcome for a game of a gaming device is presented, wherein the method comprises first outputting an apparent outcome for the game and then outputting an actual outcome for the game. In one or more embodiments, a benefit corresponding to the apparent outcome may not be provided to the player playing the gaming device. For example, a hopper may be prevented from dispensing a payout associated with the apparent outcome. In accordance with one or more embodiments, a character (e.g., an animated character) may be displayed as changing the apparent outcome into the actual outcome.

10 Claims, 20 Drawing Sheets

800

| RANDOM NUMBER RANGE 810 | METHOD FOR DISPLAYING OUTCOME 820 |
|---|---|
| 00001 - 04000 | OUTPUT ONLY ACTUAL OUTCOME |
| 04001 - 09000 | OUTPUT APPARENT OUTCOME FIRST AND OUTPUT ACTUAL OUTCOME 3 SECONDS LATER |
| 09001 - 10648 | OUTPUT ACTUAL OUTCOME FIRST THEN 2 SECONDS LATER OUTPUT APPARENT OUTCOME THEN 2 SECONDS LATER OUTPUT ACTUAL OUTCOME AGAIN |

U.S. PATENT DOCUMENTS

| | | | | |
|---|---|---|---|---|
| 5,437,462 | A | 8/1995 | Breeding | |
| 5,483,444 | A | 1/1996 | Heintzeman et al. | |
| 5,494,287 | A * | 2/1996 | Manz | 273/143 R |
| 5,511,781 | A | 4/1996 | Wood | |
| 5,542,669 | A | 8/1996 | Charron | |
| 5,601,488 | A | 2/1997 | Kadlic | |
| 5,674,128 | A | 10/1997 | Holch et al. | |
| 5,695,402 | A | 12/1997 | Stupak | |
| 5,704,835 | A | 1/1998 | Dietz, II | |
| 5,720,662 | A | 2/1998 | Holmes, Jr. et al. | |
| 5,752,882 | A | 5/1998 | Acres | |
| 5,766,075 | A | 6/1998 | Cook et al. | |
| 5,775,992 | A | 7/1998 | Wood et al. | |
| 5,876,284 | A | 3/1999 | Acres et al. | |
| 5,910,048 | A | 6/1999 | Feinberg | |
| 5,967,896 | A | 10/1999 | Jorasch | |
| 5,971,850 | A | 10/1999 | Liverance | |
| 5,988,638 | A | 11/1999 | Rodesch et al. | |
| 6,033,307 | A | 3/2000 | Vancura | |
| 6,056,642 | A | 5/2000 | Bennett | |
| 6,086,066 | A | 7/2000 | Takeuchi et al. | |
| 6,089,977 | A | 7/2000 | Bennett | |
| 6,113,493 | A | 9/2000 | Walker et al. | |
| 6,142,872 | A | 11/2000 | Walker et al. | |
| 6,176,781 | B1 | 1/2001 | Walker et al. | |
| 6,190,254 | B1 | 2/2001 | Bennett | |
| 6,251,013 | B1 | 6/2001 | Bennett | |
| 6,254,482 | B1 | 7/2001 | Walker et al. | |
| 6,270,411 | B1 * | 8/2001 | Gura et al. | 463/20 |
| 6,287,194 | B1 * | 9/2001 | Okada et al. | 463/16 |
| 6,302,790 | B1 | 10/2001 | Brossard | |
| 6,315,663 | B1 * | 11/2001 | Sakamoto | 463/20 |
| 6,319,125 | B1 | 11/2001 | Acres | |
| 6,343,989 | B1 | 2/2002 | Wood et al. | |
| 6,375,187 | B1 | 4/2002 | Baerlocher | |
| 6,416,411 | B1 * | 7/2002 | Tsukahara | 463/35 |
| 6,537,150 | B1 | 3/2003 | Luciano et al. | |
| 6,582,306 | B1 | 6/2003 | Kaminkow | |
| 6,585,592 | B1 | 7/2003 | Crumby | |
| 6,605,002 | B2 | 8/2003 | Baerlocher | |
| 6,659,867 | B1 * | 12/2003 | Kodachi et al. | 463/20 |
| 6,729,961 | B1 | 5/2004 | Millerschone | |
| 6,832,959 | B2 | 12/2004 | Baerlocher | |
| 6,855,054 | B2 | 2/2005 | White et al. | |
| 6,875,106 | B2 | 4/2005 | Weiss et al. | |
| 6,884,168 | B2 | 4/2005 | Wood et al. | |
| 6,918,834 | B2 | 7/2005 | Vancura | |
| 7,001,278 | B2 | 2/2006 | Maya et al. | |
| 2002/0065127 | A1 * | 5/2002 | Kamimura et al. | 463/20 |
| 2002/0065131 | A1 | 5/2002 | Seelig | |
| 2002/0175466 | A1 | 11/2002 | Loose et al. | |
| 2003/0008698 | A1 | 1/2003 | Stone | |
| 2003/0050108 | A1 | 3/2003 | Gauselmann | |
| 2004/0005918 | A1 * | 1/2004 | Walker et al. | 463/16 |
| 2004/0097280 | A1 | 5/2004 | Gauselmann | |

FOREIGN PATENT DOCUMENTS

| | | |
|---|---|---|
| WO | WO0032286 | 6/2000 |
| WO | WO 01/70355 A1 | 9/2001 |

OTHER PUBLICATIONS

Marshall Fey, Slot Machines, 1983, First Edition, p. 162.

Office Action dated Oct. 6, 2006 for U.S. Appl. No. 10/395,621 (02-024) 9 pages.

Office Action dated May 3, 2007 for U.S. Appl. No. 10/395,621 (02-024) 17 pages.

Notice of Allowance for U.S. Appl. No. 10/328,116 (02-023) dated Mar. 31, 2008, 7pp.

Notice of Allowance for U.S. Appl. No. 10/328,116 (02-023) dated Sep. 7, 2007, 9pp.

Office Action for U.S. Appl. No. 10/328,116 (02-023) dated Mar. 22, 2007, 16 pp.

Office Action for U.S. Appl. No. 10/328,116 (02-023) dated Oct. 3, 2006, 10 pp.

International Search Report for Serial No. PCT/US03-08729 dated Jul. 24, 2003, 3pp.

* cited by examiner

600

| RANDOM NUMBER 610 | OUTCOME 620 |
|---|---|
| 00001 | 7 / 7 / 7 |
| 00002 | OTHER |
| 00003 | ANY / ANY / CHERRY |
| 00004 | OTHER |
| 00005 | OTHER |
| 00006 | ANY / ANY / CHERRY |
| ⋮ | ⋮ |
| 00112 | BAR / BAR / BAR |
| 00113 | OTHER |
| 00114 | ANY / ANY / CHERRY |
| 00115 | OTHER |
| 00116 | OTHER |
| 00117 | BAR / PLUM / PLUM |
| ⋮ | ⋮ |
| 03456 | BELL / BELL / BELL |
| 03457 | ANY / ANY / CHERRY |
| 03458 | OTHER |
| 03459 | OTHER |
| ⋮ | ⋮ |
| 10647 | ORANGE / ORANGE / ORANGE |
| 10648 | ORANGE / ORANGE / BAR |

PRIOR ART

FIG. 6A

650

| OUTCOME 660 | PAYOUT 670 |
|---|---|
| CHERRY / ANY / ANY | 2 |
| ANY / ANY / CHERRY | 2 |
| CHERRY / CHERRY / ANY | 5 |
| ANY / CHERRY / CHERRY | 5 |
| CHERRY / ANY / CHERRY | 5 |
| CHERRY / CHERRY / CHERRY | 20 |
| BAR / ORANGE / ORANGE | 10 |
| ORANGE / ORANGE / BAR | 10 |
| ORANGE / ORANGE / ORANGE | 20 |
| BAR / PLUM / PLUM | 14 |
| PLUM / PLUM / BAR | 14 |
| PLUM / PLUM / PLUM | 20 |
| BAR / BELL / BELL | 18 |
| BELL / BELL / BAR | 18 |
| BELL / BELL / BELL | 20 |
| BAR / BAR / BAR | 50 |
| 7 / 7 / 7 | 100 |

PRIOR ART

FIG. 6B

700

| | RANDOM NUMBER 710 | APPARENT OUTCOME 720 | ACTUAL OUTCOME 730 |
|---|---|---|---|
| | 00001 | 7 / 7 / BAR | 7 / 7 / 7 |
| | 00002 | 7 / 7 / PLUM | 7 / 7 / 7 |
| | 00003 | 7 / 7 / ORANGE | 7 / 7 / 7 |
| | 00004 | 7 / 7 / BELL | 7 / 7 / ORANGE |
| | 00005 | ORANGE / BAR / BAR | 7 / BAR / BAR |
| | 00006 | 7 / BAR / BAR | BAR / BAR / BAR |
| | ⋮ | ⋮ | ⋮ |
| | 00112 | ORANGE / BAR / ORANGE | BAR / BAR / BAR |
| R702 | 00113 | 7 / BELL / BELL | BELL / BELL / BELL |
| | 00114 | BAR / BELL / PLUM | BAR / BELL / CHERRY |
| | 00115 | BAR / BELL / ORANGE | BAR / BAR / BAR |
| R704 | 00116 | BAR / BELL / PLUM | BAR / BELL / PLUM |
| | 00117 | CHERRY / PLUM / PLUM | PLUM / PLUM / PLUM |
| | ⋮ | ⋮ | ⋮ |
| R706 | 03456 | - / - / - | BELL / BELL / BELL |
| | 03457 | BELL / BELL / 7 | BELL / BELL / BELL |
| | 03458 | ORANGE / 7 / 7 | BELL / BELL / ORANGE |
| | 03459 | BELL / BELL / ORANGE | BELL / BELL / BELL |
| | ⋮ | ⋮ | ⋮ |
| | 10647 | ORANGE / ORANGE / BAR | ORANGE / ORANGE / ORANGE |
| | 10648 | CHERRY / BELL / 7 | ORANGE / ORANGE / ORANGE |

FIG. 7A

800

| RANDOM NUMBER RANGE 810 | METHOD FOR DISPLAYING OUTCOME 820 |
|---|---|
| 00001 - 04000 | OUTPUT ONLY ACTUAL OUTCOME |
| 04001 - 09000 | OUTPUT APPARENT OUTCOME FIRST AND OUTPUT ACTUAL OUTCOME 3 SECONDS LATER |
| 09001 - 10648 | OUTPUT ACTUAL OUTCOME FIRST THEN 2 SECONDS LATER OUTPUT APPARENT OUTCOME THEN 2 SECONDS LATER OUTPUT ACTUAL OUTCOME AGAIN |

FIG. 8A

900

| CHARACTER IDENTIFIER 910 | CHARACTER TITLE 920 | CHARACTER DESCRIPTION 930 |
|---|---|---|
| C 001 | GUARDIAN ANGEL | CHARACTER WITH FLOWING ROBES LIKE AN ANGEL, HAS ABILITY TO ALTER OUTCOMES FOR UP TO 25 EXTRA COINS |
| C 002 | GUARDIAN ANGEL W/TOOLS | ANGEL CHARACTER WITH TOOL KIT, HAS ABILITY TO ALTER OUTCOMES FOR UP TO 50 EXTRA COINS |
| C 003 | COURT JESTER | WEARS CLASSIC FOOL GARB, HAS ABILITY TO TEAR UP CARDS IN REMAINING DECK THAT WOULD NOT HELP PLAYER |
| C 004 | COURT JESTER | WEARS CLASSIC FOOL GARB, HAS ABILITY TO REPLACE CARDS IN PLAYER'S HAND |
| C 005 | MECHANIC | DRESSED IN OVERALLS, HAS A TOOL BAG WHICH CAN BE USED TO MOVE SLOT MACHINE REELS |
| C 006 | WIZARD | ROBE WITH POINTED HAT, HAS A SPELL BOOK THAT CAN CAST SPELLS CHANGING OUTCOMES FOR UP TO 15 EXTRA COINS. |

FIG. 9

1000

| PLAYER IDENTIFIER 1010 | NAME 1020 | FINANCIAL ACCOUNT IDENTIFIER 1030 | COMP POINTS 1040 | THEORETICAL WIN / (LOSS) 1050 | ACTUAL WIN / (LOSS) 1060 | HIDDEN ACCOUNT BALANCE 1070 | OUTCOME OUTPUT PREFERENCE(S) 1080 |
|---|---|---|---|---|---|---|---|
| 1270319 | BOB SMITH | ACCT 99 003 | 33,102 | $3,512 | $4,209 | $0 | ACTUAL OUTCOME ONLY |
| 11285739 | JIM RED | 5424 5555 8910 3218 VISA - 03/2005 | 52 | $282 | ($87) | $7.52 | ACTUAL AND APPARENT W/ CHARACTER |
| 41298800 | JOE GREEN | 99 818 5555 | 659 | $12,802 | $10,090 | $0.09 | N/A |

FIG. 10

1100

| | GAMING DEVICE IDENTIFIER 1110 | GAMING DEVICE TYPE 1120 | GAMING DEVICE LOCATION 1130 | OUTCOME OUTPUT CAPABILITY 1140 |
|---|---|---|---|---|
| | G-10G-3998-42 | VIDEO BLACKJACK | CASINO 1, AREA B-3 | ACTUAL AND APPARENT VIA GAMING DEVICE |
| R-1102 | G-20-0013-55 | VIDEO POKER | CASINO 1, AREA C-1 | ACTUAL ONLY |
| R-1103 | G-20-9981-03 | VIDEO POKER | CASINO 1, AREA C-1 | ACTUAL AND APPARENT VIA PERIPHERAL DEVICE PD-999-01 |
| R-1104 | G-50-7712-99 | ELECTRONIC REELED SLOT | CASINO 2, AREA B-7 | ACTUAL AND APPARENT VIA GAMING DEVICE |

FIG. 11

METHOD AND APPARATUS FOR OUTPUTTING OUTCOMES OF A GAMING DEVICE

The present application is a Continuation of U.S. application Ser. No. 10/328,116 filed Dec. 20, 2002 now U.S. Pat. No. 7,467,999 in the name of Walker et al, which claims the benefit of U.S. Provisional Application Ser. No. 60/373,751 filed Apr. 18, 2002 in the name of Walker et al. The entirety of the above-referenced Applications is incorporated by reference herein for all purposes.

The present Application is related to commonly-owned, co-pending U.S. Provisional Application Ser. No. 60/373,747, filed Apr. 18, 2002 in the name of Walker et al. The entirety of this related Application is incorporated by reference herein for all purposes.

BACKGROUND

The present invention relates generally to methods and apparatus for outputting outcomes of a gaming device.

Gaming devices (e.g., reeled slot machines, video poker machines, video keno machines, video blackjack, and video bingo machines) generate more than $15 billion per year in revenue for casinos in the United States alone. This figure accounts for more than half of the gaming revenue for a typical United States casino. The situation is similar in other countries in which gaming devices are popular, such as Australia. Accordingly, casino operators are interested in increasing the enjoyment of playing a slot machine in order to maintain or increase this level of revenue.

The output of an outcome on a gaming device is, or should be, an exciting moment for a player of the gaming device. It is the moment that the player is informed of whether he has won or lost the game for which the outcome is being output. Yet to date little if any attention has been paid by gaming device manufacturers and operators on how this moment may be enhanced and thus the player's enjoyment of playing the gaming device increased. Typically, enhanced graphics and sound effects are the extent of any efforts that have been put into enhancing the output of an outcome. It is thus not surprising that some players feel disappointed because the output of an outcome, even a winning one, is so brief and offers little to make it stand out from the remainder of game play. At the very least, the method of output of an outcome is typically not a reason why players select a particular gaming device to play because there is so little differentiation among gaming devices in this process.

An increase in players' enjoyment of game play by making the output of outcomes a more exciting experience would result in increased play of the gaming devices and thus an increase in revenue for the owners and operators of the gaming devices. Further, enhancing the method of output of an outcome may serve to distinguish a gaming device that incorporates the enhanced method and thus attract more players to such a gaming device. Accordingly, a need exists for enhancing the manner in which an outcome for a gaming device is output.

BRIEF DESCRIPTION OF THE FIGURES

FIG. 6A is a table illustrating an exemplary data structure of a prior art probability database.

FIG. 6B is a table illustrating an exemplary data structure of a prior art payout database.

FIG. 7A is a table illustrating an exemplary data structure of a probability database consistent with at least one embodiment of the present invention.

FIG. 8A is a table illustrating an exemplary data structure of a display method database for use in an embodiment of the present invention.

FIG. 9 is a table illustrating an exemplary data structure of a character database, consistent with at least one embodiment of the present invention.

FIG. 10 is a table illustrating an exemplary data structure of a player database, consistent with at least one embodiment of the present invention.

FIG. 11 is a table illustrating an exemplary data structure of a gaming device database, consistent with at least one embodiment of the present invention.

DETAILED DESCRIPTION

Figure 1A:
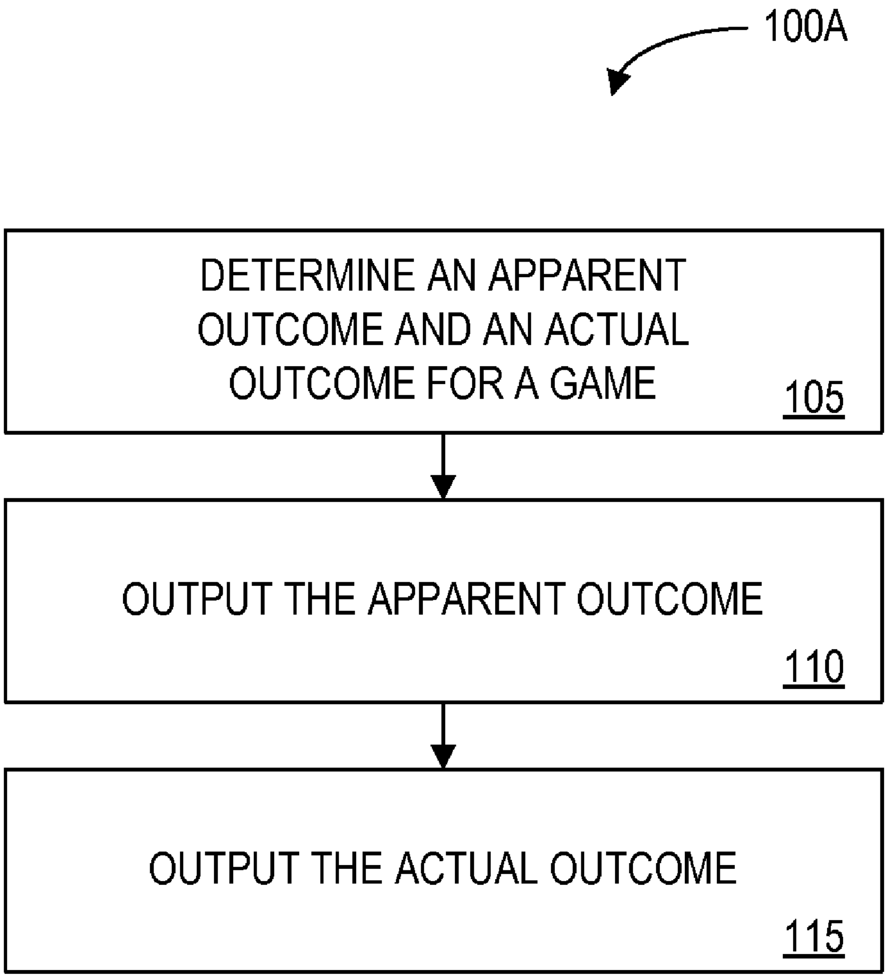
FIG. 1A is a flowchart depicting a process consistent with at least one embodiment of the present invention.

The present invention relates to outputting outcomes of a gaming device. More particularly, the present invention relates to methods for outputting outcomes of a gaming device wherein, in at least one embodiment, the gaming device determines two outcomes for a game, outputs the first outcome as an apparent outcome of the game, and outputs the second outcome as the actual outcome of the game.

Applicants have recognized that the revelation of an outcome of a game is an emotional highlight in a player's experience of playing the gaming device. Applicants have also recognized that many such moments are typically very brief and insufficiently exciting for many players. For example, a player who wins a small payout (e.g., four coins) may actually feel disappointed that he did not win more, rather than feeling excited about the small win. This may be due to the player's expectations right before the outcome is revealed. For example, a typical player may be hoping for one of the larger available payouts as the reels of a slot machine are spinning.

The player's hopes may be quite high. The typical player, between the time of game initiation and the revelation of the outcome for a game, feels that he has the very real potential of winning a lot of money when the reels stop spinning. Thus, when the reels stop to reveal an outcome that corresponds to one of the smaller payouts (e.g. "cherry-cherry-any", an outcome that may correspond to five coins), the player may feel let down and disappointed. Before the reels stopped spinning, the player in his mind's eye may have been picturing a lot more money being his. Thus, once the outcome corresponding to the small payout is revealed, the player may perceive all the money in his mind's eye as being taken from him, even though it was never actually his to begin with. A player that, consciously or not, sets himself up with such expectations at the initiation of a game is bound to get discouraged from playing the gaming device if his expectations are not consistently met.

Unfortunately, in order to remain a profitable business, a gaming device operator cannot meet such player expectations on a consistent basis. Accordingly, Applicants have recognized that a gaming device operator, in order to help prevent a player from becoming too discouraged to play a gaming device, needs to manage the player's expectations and/or output an outcome in a manner that is exciting to a player regardless of the value of any associated payout or other benefit.

Applicants have recognized that managing the player's expectations before an outcome is revealed may add excitement and enjoyment to the moment when an outcome, even one that corresponds to a small payout, is revealed. For example, in the above example, assume that the player is again expecting or hoping for a high payout and in his mind's eye imagines a large amount of money as being his due to the high payout. Now assume that when the reels of the slot machine stop spinning, the outcome that is revealed does not correspond to any payout. Again, the player is very disappointed and imagines the money he'd been picturing in his mind's eye being taken from him. The player's disappointment at this stage may be almost equivalent to the disappointment he would have felt if the outcome had instead corresponded to a payout of four coins. For example, a player playing video poker who obtains an initial hand that is a draw to a royal flush (e.g., the initial hand comprises an Ace-King-Queen-Jack (each of the spades suit)) may feel very disappointed if he draws a Queen of clubs, which results in a final hand that only pays out for the pair of Queens (typically a one coin payout). Because the player viewed the game as his chance at winning a high payout, any payout substantially less than that may be perceived as a losing payout by the player. Thus, the player's expectations are low at this point. In his mind's eye he is not picturing any money. If, at this point, the outcome previously revealed to the player were altered such that it corresponded to any payout, even a small one, the player would feel very excited. The player would perceive the small payout (e.g., even the 4 coin payout) to be an unexpected gift and would perceive it as a lot more valuable than if it had originally been provided to him while he was expecting a much larger payout.

Applicants have recognized that the psychological perception of the value of a payout may be managed by managing the manner in which the outcome is presented to the player. Further, Applicants have recognized that being provided with an unexpected win, even once in a while, would make playing a gaming device much more exciting to a player. Applicants have also recognized that the order in which winning and non-winning outcomes are obtained affects a player's emotional state at the end of game play. For example, a player who first obtains a winning outcome and subsequently obtains several consecutive non-winning outcomes may feel more disappointed in a gambling session than a player who first obtains several consecutive non-winning outcomes before obtaining a winning outcome.

Accordingly, the present invention comprises systems and methods for outputting outcomes to players of a gaming device in a manner that enhances the player's enjoyment of playing the gaming device. In accordance with one or more embodiments, an apparent outcome for a game of a gaming device is output before an actual outcome of the game is output (e.g., the actual outcome may replace the apparent outcome). For example, a first set of indicia (e.g., reel symbols along a payline of a slot machine or the cards comprising the final hand in a game of video poker) that comprises an apparent outcome may first be displayed to a player. After a predetermined amount of time (e.g., 2-4 seconds), a second set of indicia that comprises the actual outcome of the game may then be displayed to the player.

An apparent outcome, as used herein unless expressly indicated otherwise, comprises an outcome that appears to be the final result of game because it is output at a time or in a manner that a final result of the game is typically presented. This may be contrasted with, for example, an intermediary stage of a game (e.g., an initial hand in video poker) that a player knows is not the final result but merely a preliminary step to obtaining a final result (e.g., due to the normal order of the game play). In the present invention, an apparent outcome may be indistinguishable from an actual outcome until the actual outcome is output.

An actual outcome, as used herein unless expressly indicated otherwise, comprises an outcome that is the final result of the game, after the output of which a new game may immediately be initiated.

In accordance with one or more embodiments, the output of an outcome for a game of a gaming device may further be enhanced by use of a graphic of a character (e.g., an animated character). For example, the character may be displayed such that it appears to change the first set of indicia into the second set of indicia. The character may, in one or more embodiments, be embodied as a character that is typically perceived as a helpful character (e.g., an angel, a mechanic, or a fairy godmother). This may serve to further increase the perception that the character is helping the player (e.g., by changing a less favorable outcome to a more favorable outcome).

One benefit that may be realized by the use of a character that appears to change an apparent outcome into a (in some embodiments) more favorable actual outcome, is the association of the character with a positive or favorable event. Players may become accustomed to associating the character with beneficial or fun features of playing a gaming device and may thus be more inclined to play another gaming device that employs the same character.

The scope of the present invention and embodiments thereof may be understood more fully with reference to the following figures. It should be noted that the embodiments described with reference to the following figures are presented for illustrative purposes only and are not meant to be limiting in any sense. It should also be noted that, as used herein, the terms "an embodiment", "embodiment", "embodiments", "the embodiment", "the embodiments" "one or more embodiments", "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

Embodiments of the present invention will first be introduced by means of flowcharts that illustrate some basic processes that may be utilized by an entity practicing the present invention. The system infrastructure will then be described with reference to block diagrams of exemplary systems and devices that may be utilized by an entity practicing the present invention. Exemplary data structures illustrating tables that may be used when practicing embodiments of the present invention will then be described, along with corresponding flowcharts that illustrate exemplary processes that utilize the exemplary tables.

Referring now to FIG. 1A, a flowchart illustrates a process 100A that is consistent with one or more embodiments of the present invention. The process 100A is a method for outputting outcomes of a gaming device. The process 100A, and all other processes described herein unless expressly specified otherwise, may be performed by a gaming device, a computer (e.g., a slot server) in communication with the gaming device, a peripheral device in communication with a gaming device, a peripheral device server and/or a combination thereof. Each of these devices is described in detail below. Further, the process 100A, and all other processes described herein unless expressly specified otherwise, may include steps in addition to those expressly depicted in the Figures or described in the specification without departing from the spirit and scope of the present invention. Similarly, the steps of process 100A and any other process described herein, unless expressly specified otherwise, may be performed in an order other than depicted in the Figures or described in the specification, as appropriate.

Referring to step 105, an apparent outcome and an actual outcome for a game are determined. At least one of the apparent outcome and the actual outcome may be determined based on a random number generated by a random number generator (e.g., a random number generator of a gaming device at which the game for which the outcome is being determined has been initiated).

Figure 1B:
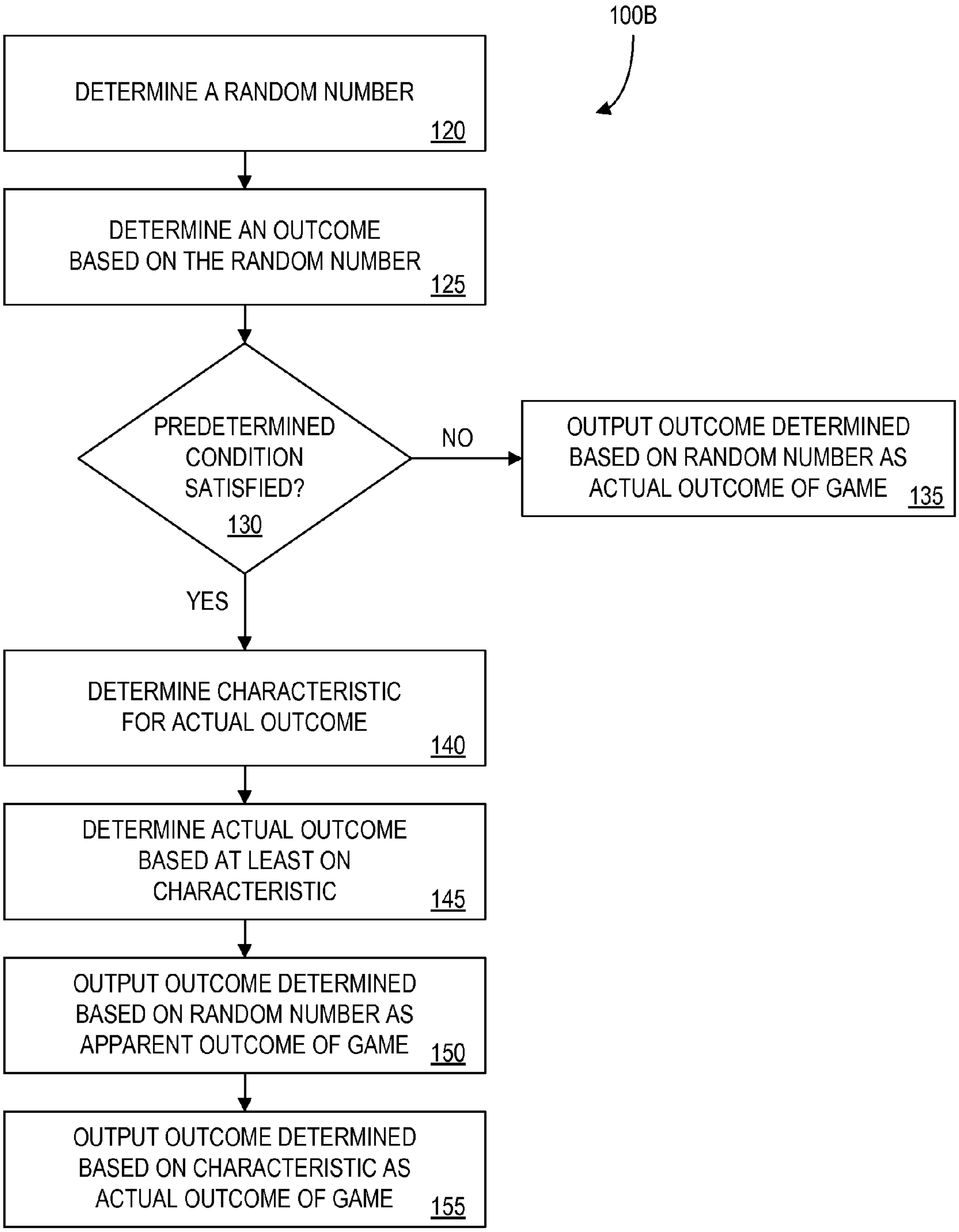
FIG. 1B is a flowchart depicting one embodiment of the process of FIG. 1A.

In some embodiments, the apparent outcome may be determined first. FIG. 1B depicts a process, consistent with one or more embodiments of the present invention, in which the apparent outcome is determined first and the actual outcome is determined second.

Figure 1C:
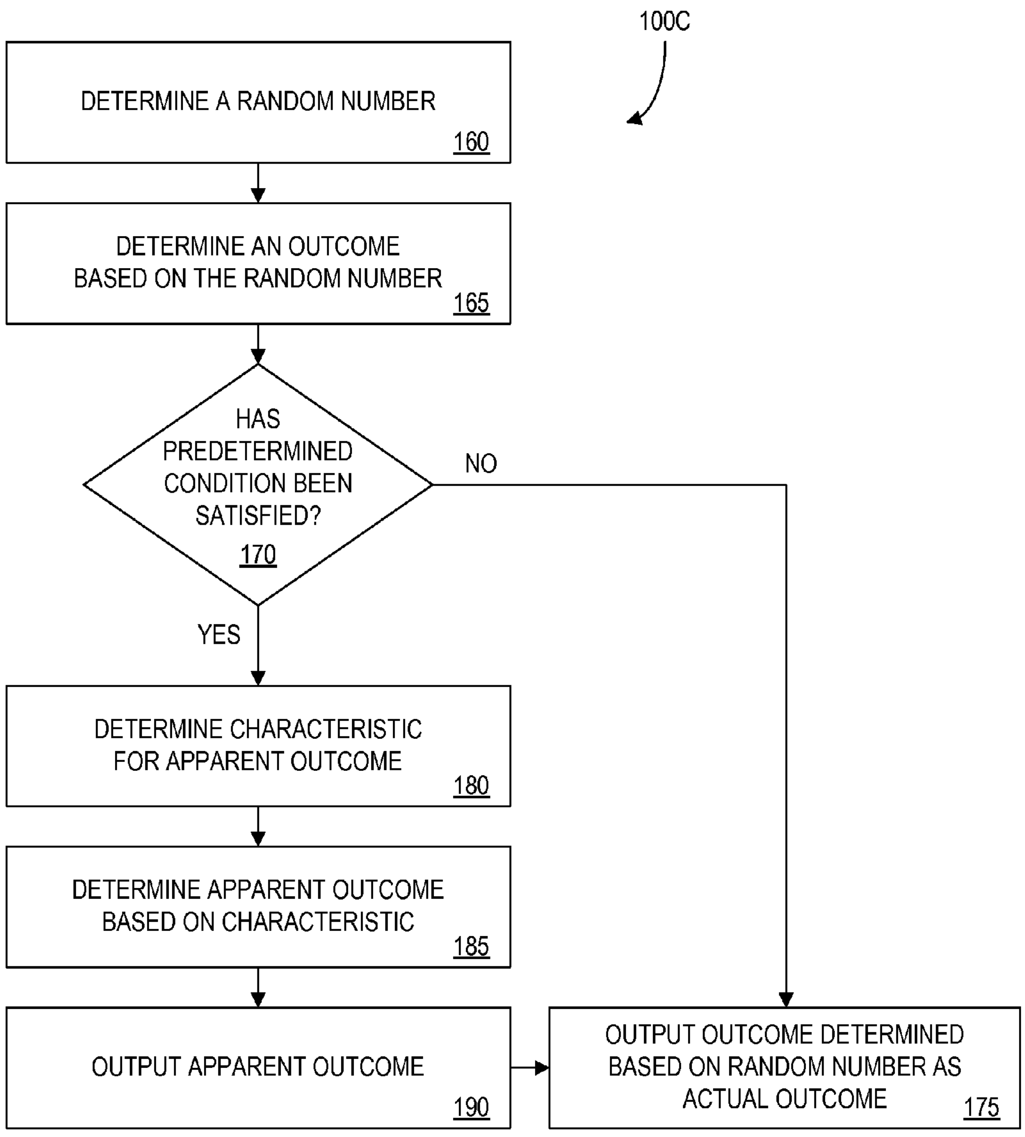
FIG. 1C is a flowchart depicting another embodiment of the process of FIG. 1A.

In some embodiments, the actual outcome may be determined first. FIG. 1C depicts a process, consistent with one or more embodiments of the present invention, in which an actual outcome is determined first and the apparent outcome is determined second.

In either the process of FIG. 1B or the process of FIG. 1C, the apparent outcome is output first and the actual outcome is output second. This is consistent with the process 100A, wherein the apparent outcome is output in step 110 and the actual outcome is output in step 115. In other embodiments, the actual outcome may be output first and the apparent outcome may be output second, or both the apparent outcome and the actual outcome may be output simultaneously or substantially simultaneously. In the latter embodiment, the player that is playing the game for which the two outcomes are being output may then (after both the actual outcome and the apparent outcome are output) be informed of which outcome is the actual outcome. Note that FIG. 1B and FIG. 1C illustrate only two possible methods for determining and outputting an actual outcome and apparent outcome on a gaming device.

Referring now to FIG. 1B, a process 100B for outputting an outcome of a game on a gaming device is illustrated. The process may be utilized, in one or more embodiments, to determine (i) whether an outcome determined based on a random number generated by a random number generator is to be output as an actual outcome and no apparent outcome should be output prior to the output of the actual outcome, or (ii) whether the outcome determined based on the random number is to be output as an apparent outcome and another outcome determined for output as an actual outcome. Process 100B illustrates one method for determining an apparent outcome and an actual outcome for a game of a gaming device.

In step 120, a random number is determined (e.g., generated by or obtained from a random number generator of a gaming device). Step 120 may be performed in response to, for example, an initiation of a game on a gaming device. A game played on a gaming device, as used herein, is to be contrasted with a type of game playable on a gaming device. A type of game playable on a gaming device may comprise, for example, "Triple Play Draw Poker"™ (a type of video poker game by International Game Technology™ (IGT™)) and "X-Factor"™ (a type of reeled slot machine game from Williams Gaming™). A game of a gaming device, in contrast, consists of an individual attempt to win a benefit available in the type of game being played by placing a wager and actuating a game initiation mechanism. For example, a player's actuation of a start or deal button (e.g., if the gaming device is a video poker device) or pull of a handle (e.g., if the gaming device is a reeled slot machine) may cause an initiation of a game, the process 100B to begin and the step 120 to be performed.

The random number determined in step 120 is used, in step 125, to determine an outcome. An outcome, as used herein, comprises at least one indicia that is utilized to inform a player of whether a benefit (e.g., a payout) has been won by the player as a result of playing a game. In a reeled slot machine game, for example, a set of symbols displayed along a payline comprises an outcome of a game. Some of the possible combinations of symbols obtainable on the reeled slot machine correspond to a payout. Thus, a player is informed of whether he has won a payout by displaying a set of symbols along the payline. If the set of symbols along the payline correspond to a payout (e.g., as displayed on a payout table of the reeled slot machine), then the player is informed that he has won the corresponding payout once the set of symbols is displayed along the payline. In a video poker gaming device, as another example, the set of cards comprising the final hand comprises the outcome of a game.

It should be noted that a benefit, as used herein, comprises anything of value obtainable as a result of placing a wager on a gaming device. A benefit may be monetary (e.g. electronic credits exchangeable for currency, coins, bills, or tokens) or non-monetary (e.g., products, services, published rank) in nature. Further, a benefit may or may not have value with an entity other than the gaming establishment in which it is obtained. For example, comp points (typically provided to a player for gambling or other desired behavior in a gaming establishment and redeemable for products and services at the gaming establishment) do not typically have a value with an entity other than the gaming establishment in which they were obtained.

Returning now to step 125, an outcome may be determined based on the random number, for example, by use of a probability table. A probability table typically stores a plurality of outcomes, each corresponding, respectively, to a number or range of numbers that may be generated by a random number generator. Note that a range of numbers defines a minimum number and a maximum number and that a random number corresponding to a range of numbers or fitting into a range of numbers means that the random number is less than the maximum number and greater than the minimum number. A probability table such as described herein may be accessed and the outcome that corresponds, in the table, to the random number determined in step 125 may be selected. At this point in the process 100B it is undetermined whether the outcome determined based on the random number is to be an actual outcome or an apparent outcome for the game being played on the gaming device.

In step 130 it is determined whether a predetermined condition has been satisfied. For example, it may be determined whether the outcome determined in step 125 satisfies a predetermined condition and/or whether another aspect of the game being played satisfies a predetermined condition. The predetermined condition, in the context of process 100B, is a condition that must be satisfied in order for the outcome determined in step 125 to be output as an apparent outcome and another outcome to be determined for output as an actual outcome for the game.

If it is determined, in step 130, that a predetermined condition has not been satisfied, the process 100B continues to step 135, where the outcome determined based on the random number (in step 125) is output as the actual outcome of the game and no apparent outcome is determined. This scenario may appear to the player as if an outcome were determined and output on a gaming device in a conventional manner, since the player may be unaware of the determinations of process 100B. If it is determined, in step 130, that a predetermined condition has been satisfied, then the process 100B continues to step 140, where a characteristic for an actual outcome is determined. At this point it has been determined, as will be clear from subsequently described steps of the process 100B, that the outcome generated by the random number generator in step 125 will be output as the apparent outcome.

An example of a predetermined condition comprises a maximum number of games played on a given gaming device for which only an actual outcome has been output. For example, it may be determined that it is desirable that no more than a maximum number of games are played (e.g. by a particular player) without both an apparent outcome and an actual outcome being output for a game.

Another example of a predetermined condition is a predetermined amount (e.g. zero coins) that the payout corresponding to the outcome determined based on the random number does not exceed. For example, it may be desirable to determine an outcome that corresponds to a payout greater than zero as the actual outcome and utilize the outcome determined in step 125 (which in the present example corresponds to a payout of zero) as the apparent outcome. This may be particularly desirable if the player who is playing the game for which the outcome is being determined has not obtained an outcome that corresponds to a payout greater than zero in a predetermined number of, for example, consecutive games. The latter example illustrates that more than one predetermined condition may need to be satisfied in step 130. The two conditions that need to be satisfied in the latter example are (i) that the outcome determined in step 125 corresponds to a payout of zero, and (ii) that the player who is playing the gaming device has not obtained an outcome that corresponds to a payout greater than zero in a predetermined number of consecutive games.

Other examples of predetermined conditions that may need to be satisfied before an outcome generated based on a random number is utilized as an apparent outcome while another outcome is determined for output as an actual outcome include, but are not limited to:

(i) a determination that the player playing the gaming device is likely to cash out after the present game (e.g., as determined based on a current amount of the credit meter balance, a length of time the player has been playing the gaming device, an actuation of a cash out button by the player, or other data);

(ii) a signal received from an employee observing the player playing the gaming device, indicating that an actual outcome is to be determined (e.g., because the employee has recognized that the player is becoming bored and/or discouraged in playing the gaming device);

(iii) a determination that another random number generated by or obtained from the random number generator corresponds to a method for outputting an outcome via both an apparent outcome and an actual outcome rather than an actual outcome only (as will be explained in more detail below);

(iv) a determination that a benefit associated with the outcome determined in step 125 corresponds to a value within a predetermined range;

(v) the occurrence of a predetermined event (e.g., a new player initiating a game, an outcome corresponding to a payout) on a nearby gaming device;

(vi) a determination that the player playing the gaming device has requested that the outcome be displayed as both an apparent outcome and an actual outcome (e.g. and paid for such method of output by inserting extra payment);

(vii) an occurrence of a predetermined time;

(viii) an occurrence of a predetermined amount of time since a predetermined event;

(ix) an occurrence of a predetermined level of activity within the gaming establishment that the gaming device is located in or near the gaming device);

(x) a determination that the player currently playing the gaming device has not previously played a type of gaming device that is operable to output both an apparent and an actual outcome for a game (e.g., as determined based on the player's gambling history that is stored in association with the player identifier);

(xi) a determination that a player's actual win/[loss] is within a predetermined range;

(xii) a determination that a balance of a hidden account associated with the player has reached a predetermined amount (an embodiment that will be explained in more detail below); and (xiii) a predetermined status being associated with a player (e.g., a "premium player" or "high roller" status).

Other appropriate predetermined conditions will be recognized by one of ordinary skill in the art after reading the present application.

The above examples of predetermined conditions have been provided for purposes of process 100B and other methods of determining whether an actual outcome different from an outcome determined based on a random number should be determined and the outcome determined based on the random number be used as an apparent outcome. Other types of predetermined conditions for other purposes are described herein.

Note that more than one predetermined condition may be available and/or necessary for satisfaction. In such embodiments, the process 100B may continue to step 140 if any one of a plurality of predetermined conditions is satisfied. Alternatively, a combination of predetermined conditions may each need to be satisfied in order for the process 100B to continue to step 140.

Referring again to step 140, a characteristic for an actual outcome for the game is determined, as noted above. A characteristic for an actual outcome is a characteristic that an outcome must satisfy in order to be output as the actual outcome for the game being played. An example of a characteristic is correspondence to a benefit of at least a predetermined value (e.g., a payout of at least a predetermined amount). For example, it may be determined that it is desirable that the apparent outcome correspond to a payout that is a smaller than the payout, if any, corresponding to the actual outcome. In other embodiments it may be desirable that the benefit, if any, corresponding to the actual outcome be of a value that is smaller than the value of a benefit corresponding to the apparent outcome.

Another example of a characteristic for the actual outcome is at least one indicia that the outcome must include. Such an indicia may comprise, for example, at least one reel symbol that must be displayed along a payline of a reeled slot machine display or at least one playing card that a final hand of a video poker game must include. The indicia that the outcome must include may be, for example, one of the indicia included in the outcome determined in step 125. Such a characteristic may aid in creating a perception that the apparent outcome that is output first is changed into the actual outcome by a minor adjustment and that the output of the actual outcome is not an output of a completely different outcome (i.e., one comprised of entirely different indicia). Other examples of characteristics include, but are not limited to:

- (i) correspondence to a benefit of at least a predetermined value;
- (ii) correspondence to a benefit of no more than a predetermined value;
- (iii) being comprised of a predetermined indicium (e.g., a favorite symbol of the player);
- (iv) being comprised of an indicium that is of a predetermined relation to an indicium that comprises the apparent outcome (e.g., the actual outcome need include a reel symbol that is located in an adjacent position, on a reel of a slot machine, to a reel symbol included in the apparent outcome);
- (v) the outcome being an outcome that the particular player playing the gaming device has not obtained in the current gaming session or within a predetermined period of time;
- (vi) the outcome being an outcome that another player has recently obtained (e.g., a friend or family member of the player or a player playing an adjacent gaming device);
- (vii) in video poker, the actual outcome being a final hand that is particularly rare based on the initial hand dealt to the player; and
- (viii) the outcome helping the player achieve another benefit (e.g., help the player attain access to or qualify for a bonus round).

Other characteristics will be recognized by one of ordinary skill in the art after reading the present application.

Note that more than one characteristic may be determined for an actual outcome in step 140. For example, it may be determined that the actual outcome must correspond to a payout greater than a predetermined amount (e.g. greater than the payout corresponding to the apparent outcome) and include at least one of the indicia that comprises the outcome determined in step 125.

Step 140 may comprise determining a characteristic based on one or more rules. In one embodiment, such one or more rules may be associated with, for example, the predetermined condition that was found to be satisfied in step 130. In another embodiment, such one or more rules may be associated with the player who is playing the game for which the actual outcome is being determined. In yet another embodiment, the one or more rules may be associated with the gaming device on which the game is being played (e.g., the same one or more rules is used to determine an actual outcome regardless of who the player is or what predetermined condition was satisfied). In yet another embodiment, the one or more rules may be selected randomly. In one exemplary method of selecting a rule randomly, a random number generated by a random number generator may be determined and a table of rules may be accessed in which each rule corresponds to a respective random number or range of random numbers that may be generated by a random number generator.

Once the characteristic for the actual outcome is determined in step 140, the process 100B continues to step 145, where the actual outcome is determined based on the characteristic. In some embodiments the actual outcome may be determined such that it possesses the exact characteristic determined in step 140. In other embodiments, the characteristic determined in step 140 may be used as a guide or goal, without the necessity of the actual outcome possessing the exact characteristic. For example, if the characteristic determined in step 140 comprises one indicium included in the outcome determined in step 125 that the actual outcome should possess, and the gaming device comprises a reeled slot machine, it may be sufficient that the actual outcome include an indicium that is displayed adjacent to one of the indicium included in the outcome determined in step 125.

Step 145 may comprise, for example, an iterative process for determining the actual outcome. For example, each of the indicium comprising the outcome determined in step 125 may in turn be changed to a different indicium until an outcome is obtained that satisfies the characteristic determined in step 140. In another example, the random number generator of the gaming device may be directed to generate a random number, or a random number may be obtained therefrom, and the outcome corresponding to the random number (e.g., as stored in a probability table and described in more detail below) may be analyzed to determine whether it satisfies the characteristic. The random number generator may continue to be directed to generate a random number, or a random number may be obtained therefrom, until a random number corresponding to an outcome that satisfies the characteristic is determined. In such an embodiment the actual outcome is determined based on a random number and another factor (the characteristic determined in step 140).

In step 150, the outcome that was determined based on the random number in step 125 is output (e.g., displayed) as the apparent outcome of the game. Outputting the apparent outcome may comprise, for example, displaying the outcome in a designated area of the gaming device in which outcomes are typically displayed, in a manner and at a time that actual outcomes are typically displayed (e.g., 2 seconds after initiation of a game) such that the player playing the gaming device cannot determine whether the outcome being displayed is an apparent outcome of the game or the actual outcome of the game. Various manners of outputting outcomes are described in detail herein.

In step 155 the actual outcome, that had been determined based on the characteristic, is output. This step may further include displaying an animated character (e.g. representing an angel or mechanic) that appears to change the apparent outcome into the actual outcome. Displaying the animated character may comprise first determining which of a plurality of animated characters to display, as will be described in detail below.

Note that the step 155 of outputting the actual outcome may be performed a predetermined time after the apparent outcome is output in step 150. For example, a casino or other operator or manufacturer of the gaming device on which the apparent outcome and the actual outcome are being displayed may determine a period of time for which it is desirable to output the apparent outcome before outputting the actual outcome. Such a time period may be, for example, 1-3 seconds long. This time period may be selected such that it is long enough to allow the player to perceive and understand the apparent outcome (e.g., think that the player has not won the game, if the apparent outcome does not correspond to any payout) but not so long that is undesirably lengthens the duration of a given game and unacceptably lowers the number of games playable on the gaming device per unit of time.

Note also that the apparent outcome of the game may be output (i.e., step 150 may be performed) at any time after the step 125. Thus, the steps 130, 140, and 145 may be performed while the apparent outcome is being output. In such embodiments, if it is determined in step 130 that a predetermined condition is not met, the performance of step 150 of outputting the apparent outcome may turn into the performance of step 135 (outputting the actual outcome), since no other outcome will be determined and the outcome determined based on the random number in step 125 is the actual and final outcome of the game.

In some embodiments, a benefit may be provided (e.g. to the player playing the gaming device) based only on the actual outcome (and not on the apparent outcome). In such embodiments, once it is determined which outcome is the actual outcome (i.e., whether it is the outcome determined in step 125, if a predetermined condition is not satisfied, or another outcome determined in step 145, if a predetermined condition is satisfied), the process 100B may continue to the steps (not shown) of determining the benefit, if any, that corresponds to the actual outcome and of providing the benefit (e.g., dispensing the coins that comprise the benefit or increasing the amount reflected in the credit meter).

In one or more embodiments, the process 100B may include a step of preventing a benefit providing means from providing the benefit associated with the apparent outcome. Such a step may be included in embodiments where, for example, a benefit corresponds to the apparent outcome and would normally be provided to the player upon output of the at least one indicia that may comprise the apparent outcome if the apparent outcome were an actual outcome. Such a step of preventing may comprise, for example, preventing a signal that would typically direct a hopper controller to dispense an amount of coins into a hopper from being transmitted. Such a step of preventing may also comprise, in another example, preventing a signal that would normally cause the amount displayed on a credit meter balance to be increased based on the benefit from being transmitted.

Of course, in some embodiments both the benefit, if any, that corresponds to the apparent outcome and the benefit, if any, that corresponds to the actual outcome may be provided to the player.

Referring now to FIG. 1C, another process, process 100C, for outputting an outcome of a game on a gaming device is illustrated. In the embodiments encompassed by process 100C, an outcome first determined based on a random number is output as the actual outcome for a game but it is further determined whether another outcome should be determined for output as an apparent outcome (e.g. for output before the actual outcome is output). Such embodiments may be useful, for example, to manage a player's expectations, as described above, and/or to prolong the player's suspense before revealing a favorable outcome as the actual outcome.

In step 160, a random number is determined (e.g., generated by or obtained from a random number generator of a gaming device). This step, similar to step 120 of process 100B (FIG. 1B), may be performed when it is determined that a new game on a gaming device has been initiated. In step 165, an outcome is determined based on the random number determined in step 160, in a manner similar to that described with respect to step 125 of process 100B (FIG. 1B).

In step 170 it is determined whether a predetermined condition has been satisfied. For example, it may be determined whether the outcome determined in step 165 satisfies a predetermined condition or whether some other aspect of the game currently being played satisfies a predetermined condition.

An example of a predetermined condition comprises a predetermined number of games having occurred since the last game for which an apparent outcome had been determined. For example, as in embodiments in which process 100B (FIG. 1B) may be practiced, it may be desirable that no more than a maximum number of games (e.g., consecutive games played by a particular player) be played without both an actual and an apparent outcome being output for a game.

Another example of a predetermined condition comprises the benefit corresponding to the outcome determined in step 165 being of a value within a predetermined range (e.g., the payout corresponding to the benefit is greater than zero coins but less than 10 coins). Such a predetermined condition may be utilized, for example, to help prevent a player from feeling disappointed when obtaining a relatively small payout. This may be accomplished by determining and outputting an apparent outcome that does not correspond to any payout (or a payout that is smaller than the payout corresponding to the outcome determined in step 165) before outputting the outcome determined in step 165 as the actual outcome.

Other examples of predetermined conditions include, but are not limited to:

(i) a request by a player that an outcome be output via both an apparent outcome and an actual outcome;

(ii) a signal received from an employee observing the player playing the gaming device, indicating that an apparent outcome is to be determined (e.g., because the employee has recognized that the player is becoming bored and/or discouraged in playing the gaming device);

(iii) a determination that another random number generated by or obtained from the random number generator corresponds to a method for outputting an outcome via both an apparent outcome and an actual outcome rather than an actual outcome only (as will be explained in more detail below);

(iv) the occurrence of a predetermined event (e.g., a new player initiating a game, an actual outcome corresponding to a payout, an output of both an actual outcome and an apparent outcome) on a nearby gaming device;

(v) an occurrence of a predetermined time;

(vi) an occurrence of a predetermined amount of time since a predetermined event;

(vii) a determination that the player currently playing the gaming device has not previously played a type of gaming device that is operable to output both an apparent and an actual outcome for a game (e.g., as determined based on the player's gambling history that is stored in association with the player identifier);

(viii) a determination that an actual win/[loss] associated with a player is within a predetermined range; and (ix) an occurrence of a predetermined level of activity within the gaming establishment that the gaming device is located in or near the gaming device.

Other predetermine conditions will be recognized by one of ordinary skill in the art after reading the present application. The examples of predetermined conditions described immediately above have been provided for purposes of process 100C and other methods of determining whether an outcome for output as an apparent outcome and that is different from an outcome determined based on a random number and to be output as an actual outcome should be determined.

If it is determined, in step 170, that a predetermined condition has not been satisfied, then the process 100C continues to step 175. In step 175 the outcome determined based on the random number (in step 165) is output as the actual outcome for the game. This may appear to a player as if the gaming device were operating conventionally, since only a single outcome is being displayed for a game and the player may not be aware of the determinations of step 100C. If, on the other hand, it is determined in step 170 that a predetermined condition has been satisfied, then the process 100C continues to step 180.

In step 180, a characteristic for an apparent outcome is determined. A desired characteristic is a characteristic that an outcome must possess in order to be output as an apparent outcome for the game being played. An example of such a characteristic is correspondence to a payout less than a predetermined amount (e.g., a payout less than the payout corresponding to the outcome determined in step 165, which is to be the actual outcome for the game). Another example of such a characteristic is being comprised of at least one predetermined indicia (e.g. at least one of the indicia comprising the outcome determined in step 165, which is to be the actual outcome for the game). Other examples of such characteristics include, but are not limited to:

(i) correspondence to a benefit of at least a predetermined value;

(ii) correspondence to a benefit of no more than a predetermined value;

(iii) being comprised of a predetermined indicium (e.g., a favorite symbol of the player);

(iv) being comprised of an indicium that is of a predetermined relation to an indicium that comprises the actual outcome (e.g., the apparent outcome need include a reel symbol that is located in an adjacent position, on a reel of a slot machine, to a reel symbol included in the actual outcome);

(v) the outcome be an outcome that the particular player playing the gaming device has obtained in the current gaming session or within a predetermined period of time that is not favorable and rare in occurrence;

(vi) the outcome be an outcome that another player has recently obtained (e.g., a friend or family member of the player or a player playing an adjacent gaming device);

(vii) in video poker, the actual outcome be a final hand that is particularly rare based on the initial hand dealt to the player; and (viii) the outcome does not help the player achieve another benefit (e.g., not help the player attain access to or qualify for a bonus round).

Other characteristics will be recognized by one of ordinary skill in the art after reading the present application.

Note that more than one characteristic may be determined for an apparent outcome in step 180. For example, it may be determined that the apparent outcome must correspond to a payout less than a predetermined amount (e.g., less than the payout corresponding to the actual outcome) and include at least one of the indicia that comprises the outcome determined in step 165.

Step 180 may comprise determining a characteristic based on one or more rules. In one embodiment, such one or more rules may be associated with, for example, the predetermined condition that was found to be satisfied in step 170. In another embodiment, such one or more rules may be associated with the player who is playing the game for which the apparent outcome is being determined. In yet another embodiment, the one or more rules may be associated with the gaming device on which the game is being played (e.g., the same one or more rules is used to determine an apparent outcome regardless of who the player is or what predetermined condition was satisfied). In yet another embodiment, the one or more rules may be selected randomly. In one exemplary method of selecting a rule randomly, a random number generated by a random number generator may be determined and a table of rules may be accessed in which each rule corresponds to a respective random number or range of random numbers that may be generated by a random number generator.

In step 185, an apparent outcome is determined based on the characteristic that was determined in step 180. In some embodiments, the apparent outcome may be determined such that it possesses the exact characteristic determined in step 180. In other embodiments, the characteristic determined in step 180 may be used as a guide or goal, without the necessity of the apparent outcome possessing the exact characteristic. For example, if the characteristic determined in step 180 comprises one indicium included in the outcome determined in step 165 that the actual outcome should possess, and the gaming device comprises a reeled slot machine, it may be sufficient that the apparent outcome include an indicium that is displayed adjacent to one of the indicium included in the outcome determined in step 165.

Step 185 may comprise, for example, an iterative process for determining the apparent outcome. For example, each of the indicium comprising the outcome determined in step 165 may in turn be changed to a different indicium until an outcome is obtained that satisfies the characteristic determined in step 180. In another example, the random number generator of the gaming device may be directed to generate a random number, or a random number may be obtained therefrom, and the outcome corresponding to the random number (e.g., as stored in a probability table and described in more detail below) may be analyzed to determine whether it satisfies the characteristic. The random number generator may continue to be directed to generate a random number, or a random number may be obtained therefrom, until a random number corresponding to an outcome that satisfies the characteristic is determined. In such an embodiment the apparent outcome is determined based on a random number and another factor (the characteristic determined in step 180).

In step 190 the apparent outcome that was determined based on the characteristic is output as an apparent outcome. This step may be performed similarly to step 150 of process 100B (FIG. 1B). The process 100C then continues to step 175, where the outcome determined based on the random number (in step 165) is output as the actual outcome. Step 175 may be performed similarly to step 155. Note that, similarly to process 100B, the actual outcome may be output a predetermined time after the apparent outcome is output or, in some embodiments, at the same or substantially the same time as the apparent outcome is output. In the latter embodiments, the player may then be informed of which outcome is the actual outcome (e.g., via a graphic or audio output).

Figure 2A:
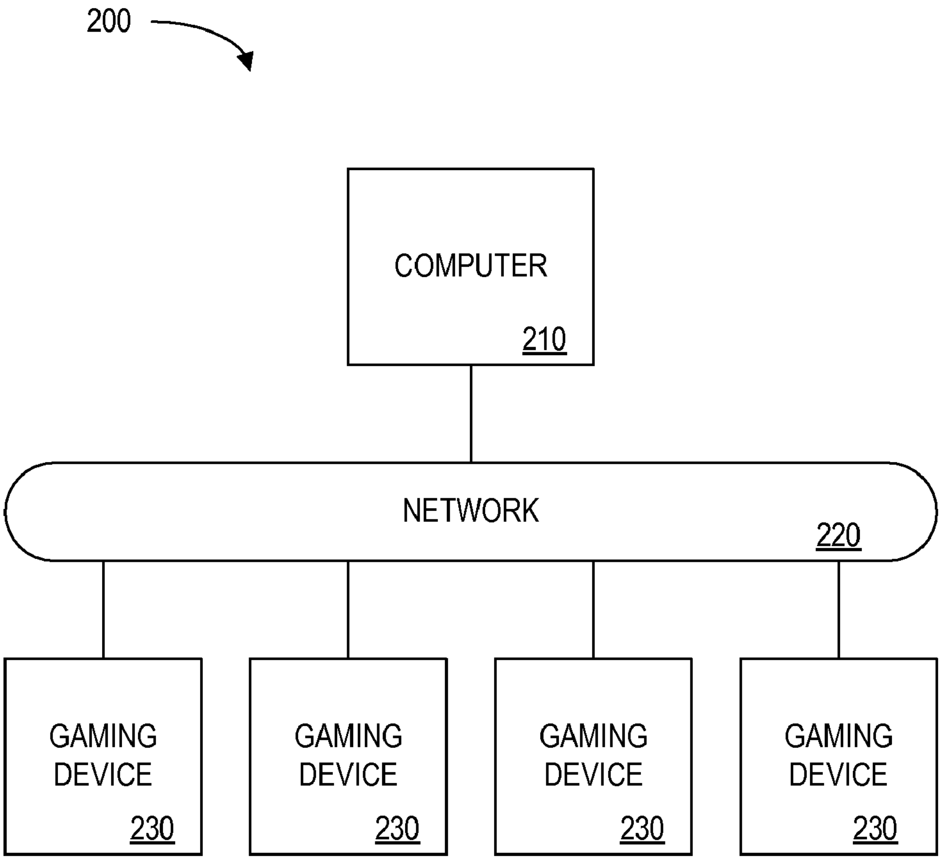
FIG. 2A is a block diagram of a system consistent with at least one embodiment of the present invention.

Referring now to FIG. 2A, a block diagram of a system 200 according to at least one embodiment of the present invention includes a computer 210 (e.g. a slot server of a casino) that is in communication, via a communications network 220, with one or more gaming devices 230 (e.g. slot machines, video poker machines). The computer 210 may communicate with the devices 230 directly or indirectly, via a wired or wireless medium such as the Internet, LAN, WAN or Ethernet, Token Ring, or via any appropriate communications means or combination of communications means. Each of the devices 230 may comprise computers, such as those based on the Intel® Pentium® processor, that are adapted to communicate with the computer 210. Any number and type of devices 230 may be in communication with the computer 210.

Communication between the devices 230 and the computer 210, and among the devices 230, may be direct or indirect, such as over the Internet through a Web site maintained by computer 210 on a remote server or over an on-line data network including commercial on-line service providers, bulletin board systems and the like. In yet other embodiments, the devices 230 may communicate with one another and/or computer 210 over RF, cable TV, satellite links and the like.

Some, but not all, possible communication networks that may comprise network 220 or be otherwise part of system 200 include: a local area network (LAN), a wide area network (WAN), the Internet, a telephone line, a cable line, a radio channel, an optical communications line, a satellite communications link. Possible communications protocols that may be part of system 200 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the computer 210 may not be necessary and/or preferred. For example, the present invention may, in one or more embodiments, be practiced on a stand-alone gaming device 230 and/or a gaming device 230 in communication only with one or more other gaming devices 230. In such an embodiment, any functions described as performed by the computer 210 or data described as stored on the computer 210 may instead be performed by or stored on one or more gaming devices 230.

Figure 2B:
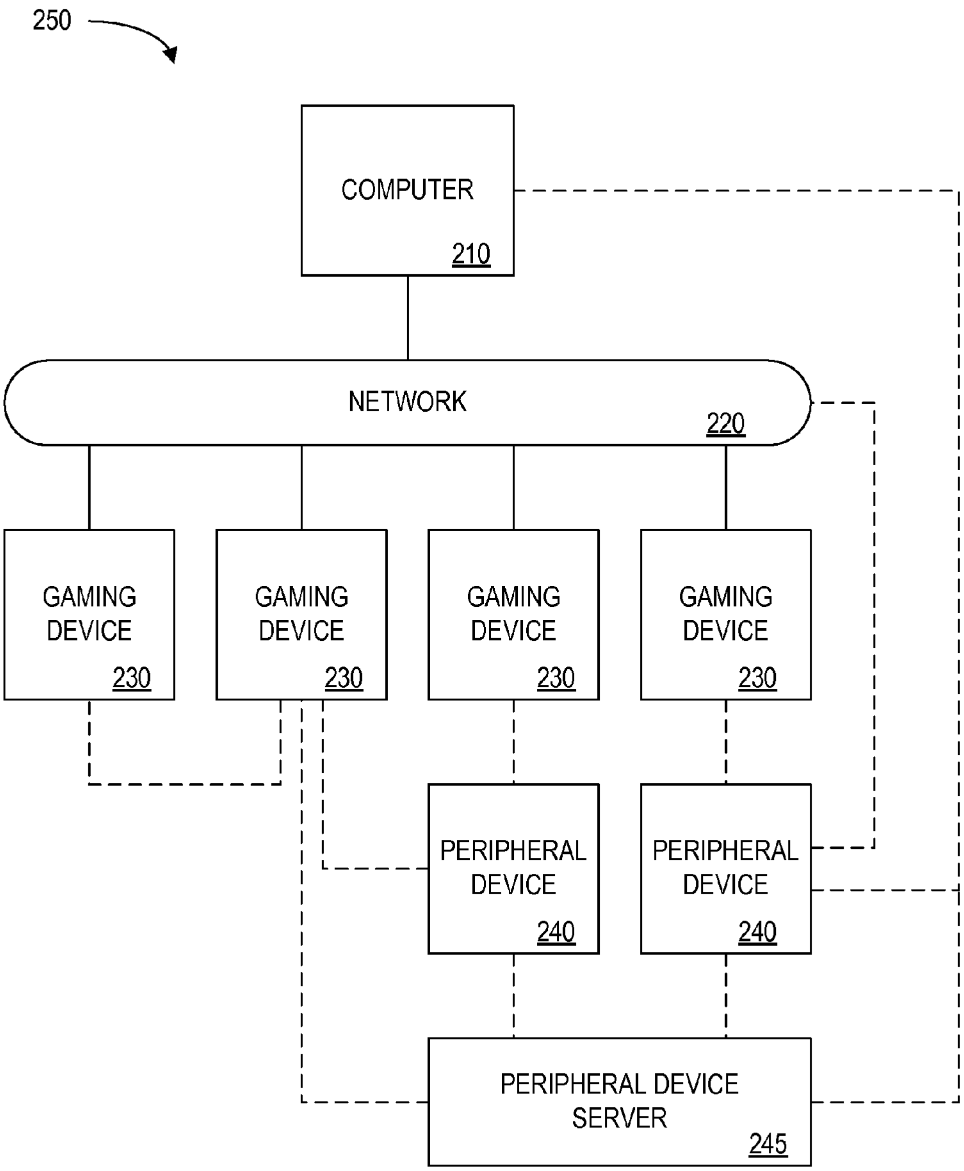
FIG. 2B is a block diagram of another system consistent with at least one embodiment of the present invention.

Referring now to FIG. 2B, a block diagram of another system 250 according to at least one embodiment of the present invention includes a computer 210 (e.g. a slot server of a casino) that is in communication, via a communications network 220, with one or more gaming devices 230 (e.g. slot machines, video poker machines). A difference between system 200 (FIG. 2A) and system 250 (FIG. 2B) is that in system 250 at least one gaming device 230 is also in communication with one or more peripheral devices 240. A peripheral device 240 may, in turn, be in communication with a peripheral device server 245 and, in some embodiments, with computer 210. In one or more embodiments the peripheral device server 245 may be in communication with one or more gaming devices 240 and/or computer 210.

The computer 210 may communicate with the devices 230 and devices 240 directly or indirectly, via a wired or wireless medium such as the Internet, LAN, WAN or Ethernet, Token Ring, or via any appropriate communications means or combination of communications means. For example, the computer 210 may communicate directly with one of the gaming devices 230 (e.g., via a LAN) and indirectly (e.g., via a gaming device 230) with a peripheral device 240. In another example, the computer 210 may communicate with one of the gaming devices 230 via a LAN and with another of the gaming devices 230 via the Internet (e.g., if the particular gaming device comprises a personal computer in communication with an online casino).

Each of the devices 230 and the devices 240 may comprise computers, such as those based on the Intel® Pentium® processor, that are adapted to communicate with the computer 210. Further, each of the devices 230 may comprise a gaming device such as a mechanical or electronic slot machine, a video poker machine, a video blackjack machine, a video keno machine, a pachinko machine, a video roulette machine, and/or a lottery terminal. Further yet, each of the devices 240 may comprise an external or internal module associated with one or more of the gaming devices 230 that is capable of communicating with one or more of the gaming devices 230 and of directing the one or more gaming devices 230 to perform one or more functions. Any number of devices 230 may be in communication with the computer 210. Any number and type of peripheral devices 240 may be in communication with a gaming device 230, peripheral device server 245 and computer 210.

Communication between the devices 230 and the computer 210, between the devices 230 and devices 240, between peripheral device server 245 and the devices 240 and/or the devices 230, between the peripheral device server 245 and computer 210, among the devices 230, and among the devices 240 may be direct or indirect, such as over the Internet through a Web site maintained by computer 210 on a remote server or over an on-line data network including commercial on-line service providers, bulletin board systems and the like. In yet other embodiments, any and all of the devices of system 250 (i.e., the devices 230, the devices 240, the computer 210, and the peripheral device server 245) may communicate with one another over RF, cable TV, satellite links and the like.

Some, but not all, possible communication networks that may comprise network 220 or otherwise be part of system 250 include: a local area network (LAN), a wide area network (WAN), the Internet, a telephone line, a cable line, a radio channel, an optical communications line, a satellite communications link. Possible communications protocols that may be part of system 250 include: Ethernet (or IEEE 802.3), SAP, ATP, Bluetooth™, and TCP/IP. Communication may be encrypted to ensure privacy and prevent fraud in any of a variety of ways well known in the art.

In an embodiment, the computer 210 may not be necessary and/or preferred. For example, the present invention may, in one or more embodiments, be practiced on a stand-alone gaming device 230, one or more gaming devices in communication with one or more peripheral devices 240, one or more gaming devices in communication with peripheral device server 245, one or more peripheral devices 240 in communication with peripheral device server 245, and/or a gaming device 230 in communication only with one or more other gaming devices 230. In such an embodiment, any functions described as performed by the computer 210 or data described as stored in a memory of the computer 210 may instead be performed by or stored on one or more gaming devices 230, one or more peripheral devices 240, and/or peripheral device server 245.

Similarly, peripheral device server 245 may not be desired and/or needed in some embodiments of the present invention. In embodiments that do not involve peripheral device server 245, any or all of the functions described herein as being performed by peripheral device server 245 may instead be performed by computer 210, one or more gaming devices 230, one or more peripheral devices 240, or a combination thereof. Similarly, in embodiments that do not involve peripheral device server 245 any data described herein as being stored in a memory of peripheral device server 245 may instead be stored in a memory of computer 210, one or more gaming devices 230, one or more peripheral devices 240, or a combination thereof.

Any or all of the gaming devices 230 may, respectively, include or be in communication with a peripheral device 240. A peripheral device 240 may be a device that receives information from (and/or transmits information to) one or more gaming devices 230. For example, a peripheral device 240 may be operable to receive information about games being played on a gaming device 230, such as the initiation of a game and/or a random number that has been generated for a game.

In one or more embodiments, one or more such peripheral devices 240 may be in communication with a peripheral device server 245. This allows the peripheral device server 245 to receive information regarding a plurality of games being played on a plurality of gaming devices 230. The peripheral device server 245, in turn, may be in communication with the computer 210. It should be understood that any functions described herein as performed by a peripheral device 240 may also or instead be performed by the peripheral device server 245. Similarly, any data described herein as being stored on or accessed by a peripheral device 240 may also or instead be stored on or accessed by the peripheral device server 245.

A peripheral device 240 may be operable to access a database (e.g. of peripheral device server 245) to provide benefits (e.g., cashless gaming receipts) based on, for example, an actual outcome of a game. A peripheral device 240 may also be operable to access a database (e.g., a character database, as described in more detail below) to determine which animated character to use when outputting an apparent and/or actual outcome of a game on a gaming device.

The peripheral device server 245 may also monitor player gambling history over time by associating gambling behavior with player identifiers, such as player tracking card numbers. For example, in embodiments wherein a player selects which character is to be displayed, the peripheral device server 245 may track which character the player previously selects and subsequently use that information to present other offers to the player and/or to output other outcomes to the player. Further, information about the player obtained or accessed by peripheral device server 245 may be analyzed, e.g., to identify those players that a particular gaming machine owner, operator, or manufacturer finds most desirable. Based upon desired objectives, the peripheral device server 245 may direct the appropriate peripheral device 240 to issue customized messages to specific players that are relevant to their gambling behaviors.

Information received by a peripheral device 240 from a gaming device 230 may include gambling data such as number of games initiated per unit of time, outcomes displayed for games initiated, payouts corresponding to outcomes displayed, a credit meter balance of the gaming device, and/or data associated with the player currently playing the gaming device 230.

The functions described herein as being performed by a peripheral device server 245 and/or a peripheral device 240 may, in one or more embodiments, be performed by the computer 210 (in lieu of or in conjunction with being performed by a peripheral device server 245 and/or a peripheral device 240). Such functions may be performed by computer 210 in either system 200 (FIG. 2A) or system 250 (FIG. 2B).

In one or more embodiments, a peripheral device 240 may be useful for implementing the embodiments of the present invention into the operation of a conventional gaming device. For example, in order to avoid or minimize the necessity of modifying or replacing a program already stored in a memory of a conventional gaming device, an external or internal module that comprises a peripheral device 240 may be inserted in or associated with the gaming device.

Thus, for example, a peripheral device 240 may be utilized to monitor play of the gaming device and output messages and an outcome (actual and/or apparent) of a game. In such embodiments the gaming device 230 with which the peripheral device 240 is in communication with may continue to operate conventionally. In such embodiments the gaming device 230 may continue to output an outcome for each game played. The peripheral device 240, however, may output a second outcome when appropriate. The second outcome output by the peripheral device 240 may be an apparent outcome or an actual outcome, depending on the embodiment being practiced. The peripheral device 240 may also output messages to the player (e.g., such as "Hold on! That's not your final outcome! We can do better than that!"). The peripheral device 240 may also provide benefits to a player (e.g., coins, tokens, electronic credits, paper receipts exchangeable for cash, services, and/or merchandise).

Accordingly, a peripheral device 240 may include (i) a communications port (e.g., for communicating with one or more gaming devices 230, peripheral device server 245, another peripheral device 240, and/or computer 210); (ii) a display (e.g., for displaying messages and/or outcomes), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the peripheral device may not output outcomes and/or messages to a player but may instead direct the processor of a gaming device to perform such functions. For example, a program stored in a memory of peripheral device 240 may cause a processor of a gaming device to perform certain functions. For example, a program stored in a memory of peripheral device 240 may cause a processor of a gaming device to output an outcome, determine an outcome, output a message, access a database, provide a benefit, refrain from providing a benefit (e.g., by not sending a signal to a hopper controller of the gaming device when it otherwise normally would), and/or communicate with another device.

Figure 3:
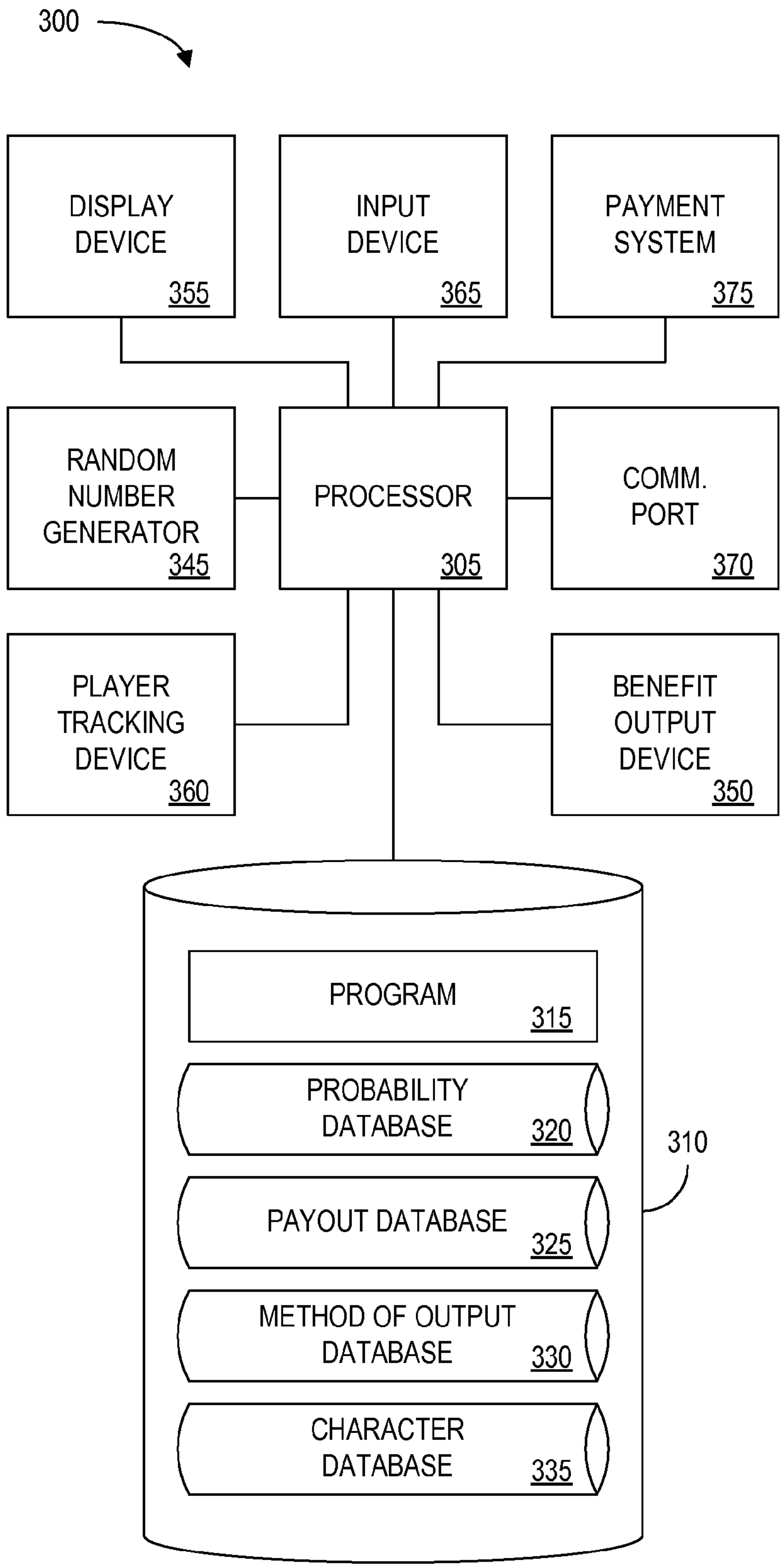
FIG. 3 is a block diagram of a computer that may be part of the system of FIG. 2A and the system of FIG. 2B, consistent with at least one embodiment of the present invention.

Referring now to FIG. 3, illustrated therein is a block diagram of an embodiment 300 of a gaming device. The gaming device 300 may be implemented as a system controller, a dedicated hardware circuit, an appropriately programmed general-purpose computer, or any other equivalent electronic, mechanical or electro-mechanical device. The gaming device 300 may comprise, for example, a slot machine, a video poker terminal, a video blackjack terminal, a video keno terminal, a video lottery terminal, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g. a personal digital assistant or Nintendo GameBoy). The gaming device 300 may comprise any or all of the gaming devices 230 of system 200 (FIG. 2A) or system 250 (FIG. 2B). In some embodiments, a user device such as a PDA or cell phone may be used in place of, or in addition to, some or all of the gaming device 300 components depicted in FIG. 3. Further, a gaming device may comprise a personal computer or other device operable to communicate with an online casino and facilitate game play at the online casino. In one or more embodiments, the gaming device 300 may comprise a computing device operable to execute software that simulates play of a reeled slot machine game, video poker game, video blackjack game, video keno game, video roulette game, or lottery game.

The gaming device 300 comprises a processor 305, such as one or more Intel® Pentium® processors. The processor 305 is in communication with a memory 310 and a communications port 370 (e.g., for communicating with one or more other devices). The memory 310 may comprise an appropriate combination of magnetic, optical and/or semiconductor memory, and may include, for example, Random Access Memory (RAM), Read-Only Memory (ROM), a compact disc and/or a hard disk. The memory 310 may comprise or include any type of computer-readable medium. The processor 305 and the memory 310 may each be, for example: (i) located entirely within a single computer or other device; or (ii) connected to each other by a remote communication medium, such as a serial port cable, telephone line or radio frequency transceiver. In one embodiment, the gaming device 300 may comprise one or more devices that are connected to a remote server computer for maintaining databases.

The memory 310 stores a program 315 for controlling the processor 305. The processor 305 performs instructions of the program 315, and thereby operates in accordance with the present invention, and particularly in accordance with the methods described in detail herein. The program 315 may be stored in a compressed, uncompiled and/or encrypted format. The program 315 furthermore includes program elements that may be necessary, such as an operating system, a database management system and "device drivers" for allowing the processor 305 to interface with computer peripheral devices. Appropriate program elements are known to those skilled in the art, and need not be described in detail herein.

The term "computer-readable medium" as used herein refers to any medium that participates in providing instructions to processor 305 (or any other processor of a device described herein) for execution. Such a medium may take many forms, including but not limited to, non-volatile media, volatile media, and transmission media. Non-volatile media include, for example, optical or magnetic disks, such as memory 310. Volatile media include dynamic random access memory (DRAM), which typically constitutes the main memory. Transmission media include coaxial cables, copper wire and fiber optics, including the wires that comprise a system bus coupled to the processor 305. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 305 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 300 (or, e.g., a computer 210) can receive the data on the telephone line and use an infrared transmitter to convert the data to an infrared signal. An infrared detector can receive the data carried in the infrared signal and place the data on a system bus for processor 305. The system bus carries the data to main memory, from which processor 200 retrieves and executes the instructions. The instructions received by main memory may optionally be stored in memory 310 either before or after execution by processor 305. In addition, instructions may be received via communication port 370 as electrical, electromagnetic or optical signals, which are exemplary forms of carrier waves that carry data streams representing various types of information. Thus, the gaming device 300 may obtain instructions in the form of a carrier wave.

According to an embodiment of the present invention, the instructions of the program 315 may be read into a main memory from another computer-readable medium, such from a ROM to RAM. Execution of sequences of the instructions in program 315 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to system 250 of FIG. 2B, execution of sequences of the instructions in a program of a peripheral device 240 in communication with gaming device 300 may also cause processor 305 to perform some of the process steps described herein.

The memory 310 also stores a plurality of databases, including a probability database 320, a payout database 325, a method of output database 330, and a character database 335. Each of these databases is described in detail below. Note that, although these databases are described as being stored in a gaming device, in other embodiments of the present invention some or all of these databases may be partially or wholly stored in another device, such as one or more of the peripheral devices 240, the peripheral device server 245 and/or the computer 210. Further, some or all of the data described as being stored in the databases 320-335 may be partially or wholly stored (in addition to or in lieu of being stored in the memory 310 of the gaming device 300) in a memory of one or more other devices, such as one or more of the peripheral devices 240, another gaming device 230, the peripheral device server 245 and/or the computer 210.

The databases 220, 225, 230, 235, and 240 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though four separate databases are illustrated, the invention could be practiced effectively using one, two, three, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

The processor 305 is also operable to communicate with a random number generator 345, which may be a component of gaming device 300. The random number generator, in accordance with at least one embodiment of the present invention, may generate data representing random or pseudo-random values (referred to as "random numbers" herein). The random number generator may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use. A random number generated by the random number generator may be used by the processor 305 to determine, for example, at least one of an apparent outcome and an actual outcome and/or a method for outputting an outcome.

A random number generator, as used herein, may be embodied as a processor separate from but working in cooperation with processor 305. Alternatively, random number generator may be embodied as an algorithm, program component, or software stored in the memory of gaming device 300 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 305 is also operable to communicate with a benefit output device 350, which may be a component of gaming device 300. The benefit output device 350 may comprise one or more devices for outputting a benefit to a player of the gaming device 300. For example, in one embodiment the gaming device 300 may provide coins and/or tokens as a benefit. In such an embodiment the benefit output device 350 may comprise a hopper and hopper controller, for dispensing coins and/or tokens into a coin tray of the gaming device 300. In another example, the gaming device 300 may provide a receipt or other document on which there is printed an indication of a benefit (e.g. a cashless gaming receipt that has printed thereon a monetary value, which is redeemable for cash in the amount of the monetary value). In such an embodiment the benefit output device 350 may comprise a printing and document dispensing mechanism. In yet another example, the gaming device 300 may provide electronic credits as a benefit (which, e.g. may be subsequently converted to coins and/or tokens and dispensed from a hopper into a coin tray). In such an embodiment the benefit output device 350 may comprise a credit meter balance and/or a processor that manages the amount of electronic credits that is indicated on a display of a credit meter balance. The processor may be the processor 305 or another processor. In yet another example, the gaming device 300 may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained.

Note that, in one or more embodiments, the gaming device 300 may include more than one benefit output device 350 even though only one benefit output device is illustrated in FIG. 3. For example, the gaming device 300 may include both a hopper and hopper controller combination and a credit meter balance. Such a gaming device may be operable to provide more than one type of benefit to a player of the gaming device. A single benefit output device 350 may be operable to output more than one type of benefit. For example, a benefit output device 350 may be operable to increase the balance of credits in a credit meter and communicate with a remote device in order to increase the balance of a financial account associated with a player.

The processor 305 is also operable to communicate with a display device 355, which may be a component of gaming device 300. The display device 355 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, a gaming device may comprise more than one display device. For example, a gaming device may comprise an LCD display for displaying electronic reels and a display area that displays rotating mechanical reels.

The processor 305 may also be in communication with one or more other devices besides the display device 355, for outputting information (e.g., to a player or another device). Such other one or more output devices may also be components of gaming device 300. Such other one or more output devices may comprise, for example, an audio speaker (e.g. for outputting an actual and/or apparent outcome or information related thereto, in addition to or in lieu of such information being output via a display device 355), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device 355 may comprise, for example, one or more display areas. For example, one of the display areas may display outcomes of games played on the gaming device (e.g. electronic reels of a gaming device). Another of the display areas may display rules for playing a game of the gaming device. Yet another of the display areas may display the benefits obtainable by playing a game of the gaming device (e.g., in the form of a payout table). In one or more embodiments, the gaming device 300 may include more than one display device, one or more other output devices, or a combination thereof (e.g., two display devices and two audio speakers).

The processor 305 is also in communication with an input device 365, which is a device that is capable of receiving an input (e.g., from a player or another device) and which may be a component of gaming device 300. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from with a second gaming device or a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 305 is also in communication with a payment system 375, which may be a component of gaming device 300. The payment system 375 is a device capable of accepting payment from a player (e.g. a bet or initiation of a balance) and/or providing payment to a player (e.g. a payout). Payment is not limited to money, but may also include other types of consideration, including products, services, and alternate currencies.

Exemplary methods of accepting payment by the payment system 375 include (i) receiving hard currency (i.e., coins or bills), and accordingly the payment system 375 may comprise a coin or bill acceptor; (ii) receiving an alternate currency (e.g., a paper cashless gaming voucher, a coupon, a non-negotiable token), and accordingly the payment system 375 may comprise a bar code reader or other sensing means; (iii) receiving a payment identifier (e.g. a credit card number, a debit card number, a player tracking card number) and debiting the account identified by the payment identifier; and (iv) determining that a player has performed a value-added activity.

In one embodiment, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

Figure 4:
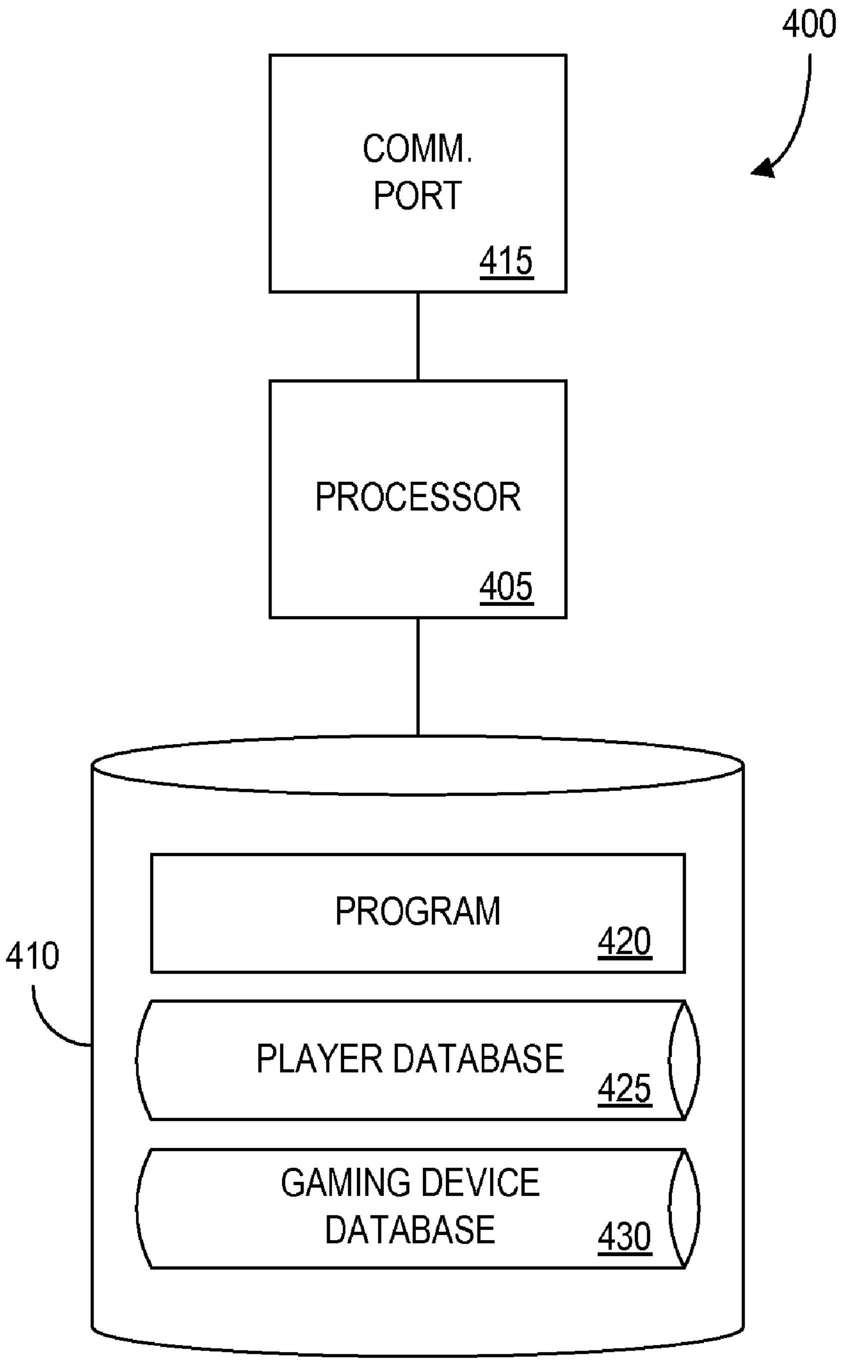
FIG. 4 is a block diagram of a gaming device that may be part of the system of FIG. 2A and the system of FIG. 2B, consistent with at least one embodiment of the present invention.

Referring now to FIG. 4, illustrated therein is a block diagram of an embodiment 400 of computer 210 (FIG. 2A and FIG. 2B). The computer 400 may be implemented as a system controller, a dedicated hardware circuit, an appropriately programmed general-purpose computer, or any other equivalent electronic, mechanical or electro-mechanical device. The computer 400 may comprise, for example, a server computer operable to communicate with one or more client devices, such as gaming devices 230. The computer 400 is operative to manage the system 200 and the system 250 and execute the methods of the present invention.

In operation, the computer 400 may function under the control of a casino, a merchant, or other entity that may also control use of the gaming devices 230, peripheral devices 240, and/or peripheral device server 245. For example, the computer 400 may be a slot server in a casino. In some embodiments, the computer 400 and slot server may be different devices. In some embodiments, the computer 400 may comprise more than one computer operating together. In some embodiments, the computer 400 and peripheral device server 245 may be the same device.

The computer 400 comprises a processor 405, such as one or more Intel® Pentium® processors. The processor 405 is in communication with a memory 410 and a communications port 415 (e.g., for communicating with one or more other devices). The memory 410 may comprise an appropriate combination of magnetic, optical and/or semiconductor memory, and may include, for example, Random Access Memory (RAM), Read-Only Memory (ROM), a compact disc and/or a hard disk. The processor 405 and the memory 410 may each be, for example: (i) located entirely within a single computer or other device; or (ii) connected to each other by a remote communication medium, such as a serial port cable, telephone line or radio frequency transceiver. In one embodiment, the computer 400 may comprise one or more devices that are connected to a remote server computer for maintaining databases.

The memory 410 stores a program 420 for controlling the processor 405. The processor 405 performs instructions of the program 420, and thereby operates in accordance with the present invention, and particularly in accordance with the methods described in detail herein. The program 420 may be stored in a compressed, uncompiled and/or encrypted format. The program 420 furthermore includes program elements that may be necessary, such as an operating system, a database management system and "device drivers" for allowing the processor 405 to interface with computer peripheral devices. Appropriate program elements are known to those skilled in the art, and need not be described in detail herein.

According to an embodiment of the present invention, the instructions of the program 420 may be read into a main memory from another computer-readable medium, such from a ROM to RAM. Execution of sequences of the instructions in program 420 causes processor 405 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 410 also stores a plurality of databases, including a player database 425 and a gaming device database 430. Each of these databases is described in detail below. Note that, although these databases are described as being stored in a gaming device, in other embodiments of the present invention some or all of these databases may be partially or wholly stored in another device, such as one or more of the peripheral devices 240, the peripheral device server 245, one or more of the gaming devices 230, a slot server (if different from the computer 210), another device, or a combination thereof. Further, some or all of the data described as being stored in the databases 425 and 430 may be partially or wholly stored (in addition to or in lieu of being stored in the memory 410 of the computer 400) in a memory of one or more other devices, such as one or more of the peripheral devices 240, one or more of the gaming devices 230, the peripheral device server 245 and/or a slot server (if different from computer 210).

Figure 5:
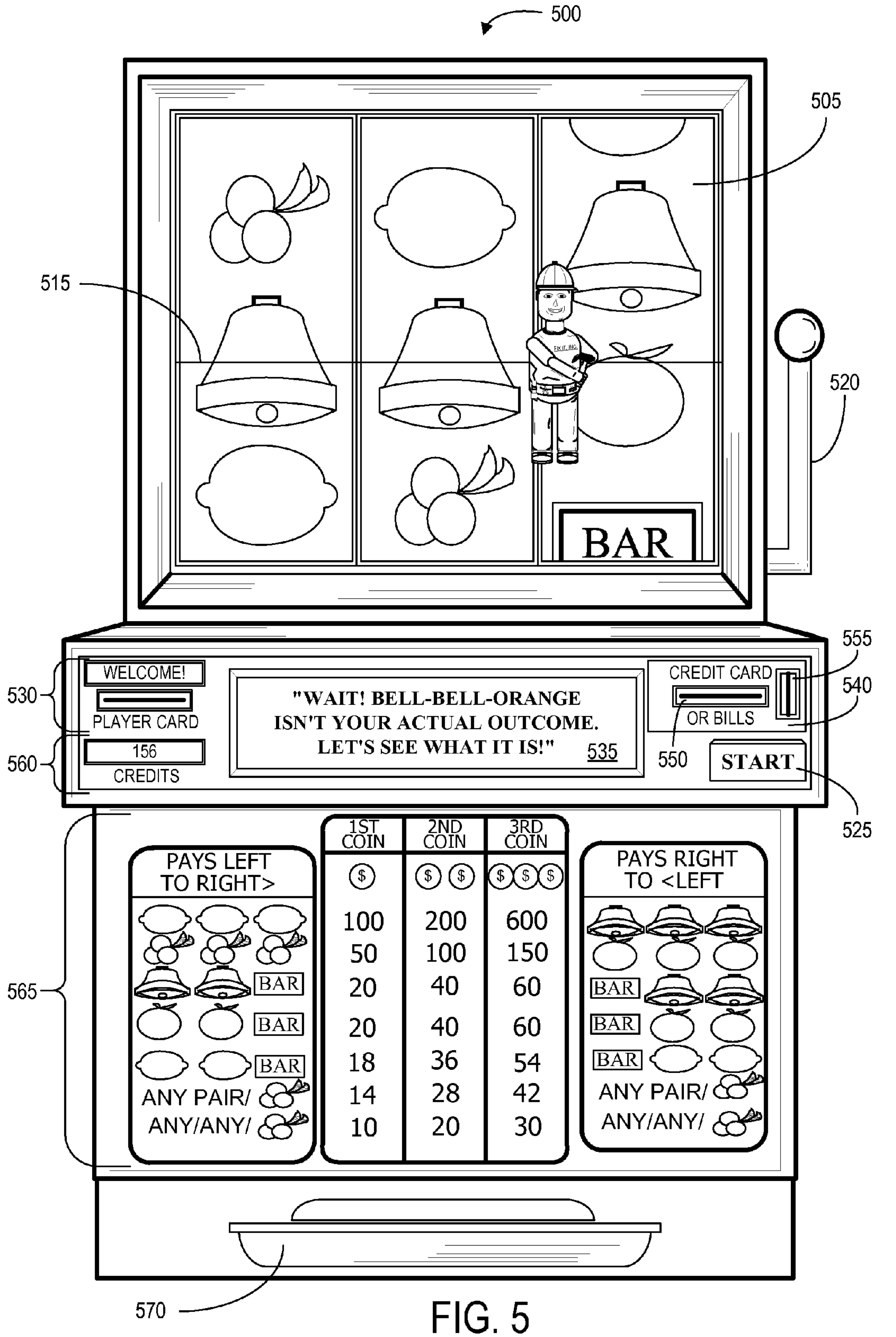
FIG. 5 is a plan view of a gaming device that may be a part of the system of FIG. 2A and the system of FIG. 2B, consistent with at least one embodiment of the present invention.

Referring now to FIG. 5, an embodiment 500 of a plan view of a gaming device 230 is illustrated. In the embodiment 500, the gaming device 230 comprises a three reel slot machine. The slot machine 500 comprises a display area 505 in which an outcome (apparent and/or actual) for a game of the slot machine is displayed to the player. The display area 505 may, for example, be a video display that displays simulations of reels. The display area 505 may, in another example, be glass behind which are located mechanical reels. Display area 505 is an exemplary embodiment of the display device 355, described with respect to FIG. 3.

Within display area 505 is a payline 515. In accordance with some embodiments of the present invention, an outcome of a game is a set of symbols displayed along a payline of a reeled slot machine. Slot machine 500 exemplifies such embodiments.

Slot machine 500 further comprises a handle 520. A player may initiate the movement of the reels in display area 505 by pulling on the handle 520. Alternatively, a player may initiate the movement of the reels in display 505 by actuating the start button 525. Either or both of handle 520 and start button 525 are exemplary embodiments of the input device 365, described with respect to FIG. 3.

Slot machine 500 also comprises a player tracking device 530, which is an example of the player tracking device 360 that was described with respect to FIG. 3. The player tracking device 350 may comprise a player tracking card reader and a display (e.g., an LED display) for outputting information related to the player identifier (e.g., player's name and number of comp points associated with player's account).

Also a component of slot machine 500 is another display area 535, for outputting information to a player. The display area 535 may be utilized, for example, to inform a player of which outcome is an actual outcome or that an outcome that is currently being output is not the actual outcome.

Payment system 540, an exemplary embodiment of payment system 375, comprises a bill acceptor 545, a credit card reader 550, and a coin acceptor 555. A player may utilize payment system 540 to provide a wager for playing a game and or for providing payment for provision of a second outcome (e.g. as an actual outcome) after a first outcome (e.g. an apparent outcome) has been displayed to a player.

Slot machine 500 further comprises a credit meter balance 560, which is an exemplary embodiment of a benefit output device 350 that was described with respect to FIG. 3. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player.

The slot machine 500 includes yet another display area, display area 565, which displays a payout schedule of the slot machine 500. The payout schedule displays payouts that correspond to various outcomes obtainable on the slot machine 500. In one or more embodiments, if an apparent outcome is displayed in display area 505 that, as indicated in display area 565, corresponds to a payout, the credit meter balance 560 may be increased by an amount of electronic credits corresponding to the payout. In other embodiments, if an apparent outcome corresponds to a payout the credit meter balance may not be increased based on the payout (e.g., the credit meter balance may only be increased based on a payout that corresponds to an actual outcome). In yet other embodiments, if an apparent outcome corresponds to a payout, as indicated in display area 565, the credit meter balance may be increased temporarily based on the payout. However, once the actual outcome is displayed, the credit meter balance may be decreased by, for example, an amount of credits (i) added based on the payout corresponding to the apparent outcome, or (ii) that the payout corresponding to the apparent outcome exceeds the payout corresponding to the actual outcome.

Finally, the slot machine 500 comprises a coin tray 570. Payment to the player may be rendered by dispensing coins into the coin tray 570. Such coins may be dispensed based on, for example, a player's indication that the player would like to cash out his credit meter balance and/or a payout obtained by a player as a result of playing a game on the slot machine 500. The coin tray 500 is an exemplary embodiment of the benefit output device 350, described with respect to FIG. 3. Note that slot machine 500 may include different and/or additional components besides those illustrated in FIG. 5.

Referring now to FIG. 6, an exemplary tabular representation 600 illustrates an embodiment of a prior art probability database. The tabular representation 600 of the probability database includes a number of example records or entries, each defining a random number. Those skilled in the art will understand that the probability database may include any number of entries. The tabular representation 600 also defines fields for each of the entries or records. The fields specify: (i) a random number 610 that is a random number that may be generated by the random number generator of a gaming device; and (ii) an outcome 620, that indicates the one or more indicia comprising the outcome that corresponds to the random number of a particular record. In the particular example illustrated by tabular representation 600, the outcomes comprise the three symbols to be displayed along the payline of a three reel slot machine. A gaming device may utilize a probability database such as that embodied in tabular representation 600 to, for example, determine what outcome corresponds to a random number generated by a random number generator and to display the determined outcome. Note that, in the prior art probability database of FIG. 6A, only a single outcome corresponds to each random number and the gaming device utilizing such a probability table simply causes the indicia corresponding to the random number to be displayed as the result of a game on a gaming device.

Referring now to FIG. 6B, an exemplary tabular representation 650 illustrates an embodiment of a prior art payout database. The tabular representation 650 of the payout database includes a number of example records or entries, each defining an outcome that may be obtained on a gaming device that corresponds to a payout. Those skilled in the art will understand that the payout database may include any number of entries. The tabular representation 650 also defines fields for each of the entries or records. The fields specify: (i) an outcome 660, which indicates the one or more indicia comprising a given outcome; and (ii) a payout 670 that corresponds to each respective outcome. In the example illustrated by tabular representation 650, the outcomes are those that may be obtained on a three reel slot machine. The outcomes are also a subset of the outcomes stored as corresponding to one of the random numbers of tabular representation 600 (FIG. 6A). A gaming device may utilize the tabular representation 650 to determine whether a payout should be output to a player as a result of an outcome obtained for a game. For example, after determining the outcome to output on the gaming device (utilizing, e.g., tabular representation 600), the gaming device may access tabular representation 650 to determine whether the outcome for output is one of the outcomes stored as corresponding to a payout. If it is, the gaming device provides the corresponding payout to the player. In some gaming devices, the data in tabular representation 600 and tabular representation 650 may be combined and stored in a single table. For example, that payout (even if it is zero) that corresponds to each outcome of the tabular representation 600 may be stored in an additional field of tabular representation 600.

Other arrangements of payout databases and probability databases are possible. For example, the book "Winning At Slot Machines" by Jim Regan (Carol Publishing Group Edition, 1997) illustrates many examples of payout and probability tables and how they may be derived. The entirety of this book is incorporated by reference herein for all purposes.

Referring now to FIG. 7A, an exemplary tabular representation 700 illustrates an embodiment of a probability database 320 (FIG. 3), in accordance with one or more embodiments of the present invention. The tabular representation 700 of the probability database includes a number of example records or entries, including entry R-702, R-704, and R-706, each defining a random number. Those skilled in the art will understand that the probability database may include any number of entries. The tabular representation 700 also defines fields for each of the entries or records. The fields specify: (i) a random number 710 that is a random number that may be generated by a random number of a gaming device or otherwise obtained for use by a gaming device; (ii) an apparent outcome 720, that comprises at least one indicia defining an outcome that is to be output as an apparent outcome for a game; and (iii) an actual outcome 730, that comprises at least one indicia defining an outcome that is to be output as an actual outcome for a game.

Note that, in tabular representation 700, not all random numbers correspond to both an apparent outcome and an actual outcome. However, in one or more embodiments, each random number may correspond to both an apparent outcome and an actual outcome.

Note also that, although one of the outcomes corresponding to a respective random number is stored as an "actual outcome" (by being stored in the actual outcome field) while another of the outcomes is stored as an apparent outcome (by being stored in the apparent outcome field), in one or more embodiments two outcomes may be stored in association with a respective random number without being labeled as an apparent and/or actual outcome in the database. For example, in accordance with one or more embodiments, once a random number and the outcomes corresponding to it are determined, a gaming device may be programmed to determine which of the outcomes to output as an apparent outcome and which of the outcomes to output as an actual outcome based on one or more rules.

Further, more than two outcomes may be stored as corresponding to a respective random number. For example, (i) two or more apparent outcomes may be stored in association with a random number, (ii) two or more actual outcomes may be stored in association with a random number. For example, in one or more embodiments, a first apparent outcome may be output to a player, a second apparent outcome may be then output to a player, and finally an actual outcome may be output to a player. In another example, a gaming device or peripheral device may be programmed to select which of a plurality of apparent outcome and/or which of a plurality of actual outcomes that are each stored in association with a respective random number to output as a result of a game. Such determinations may be performed, for example, based on one or more rules.

Note further that, even though both an apparent outcome and an actual outcome may correspond to a random number, both the apparent outcome and the actual outcome may not be output for a game even though both correspond to a random number that has been determined for a game. For example, in one or more embodiments a gaming device may determine whether to output both an apparent outcome and an actual or whether to output only one of the outcomes as an actual outcome. The gaming device may make such a determination based on one or more rules. Such rules may be similar to the determinations of whether a predetermined condition has been satisfied, as described with respect to step 130 of process 100B (FIG. 1B) and step 170 of process 100C (FIG. 1C). In another example, a determination of whether to output both an apparent outcome and an actual outcome for a game (if both correspond to a random number determined for a game) may be based on a determination of which of a plurality of output methods to use to output the outcome of the game. An example of such a method is described below with respect to FIG. 8A and FIG. 8B.

The tabular representation 700 may be utilized to determine what set of indicia to display as an apparent outcome and what set of indicia to output as an actual outcome. For example, tabular representation 700 may be utilized in a process similar to process 100B. However, instead of determining a characteristic for an actual outcome during play of a game and then determining the actual outcome based on the characteristic, the gaming device may instead simply determine what set of indicia comprising an actual outcome corresponds to the random number determined in step 120 in tabular representation 700. The actual outcome stored as corresponding to a particular apparent outcome may have been determined for inclusion in a particular record of tabular representation 700 based on the same or similar considerations described with respect to the characteristics for an actual outcome in step 140 of process 100B. For example, an actual outcome and an apparent outcome may have been selected for inclusion in the same record of tabular representation 700 such that (i) at least one indicia is included in the same reel position of both outcomes, and/or (ii) a value of a benefit corresponding to the apparent outcome is less than a value of a benefit corresponding to the actual outcome. Similarly, the tabular representation 700 may be utilized in process 100C to determine an apparent outcome rather than performing the steps 170, 180, and 185.

Utilizing a database, such as tabular representation 700, wherein a random number corresponds to more than one outcome (e.g., one of the outcomes being an apparent outcome and one of the outcomes being an actual outcome) may be a quick and efficient method of practicing one or more embodiments of the present invention. The structure of the database is similar to that of probability tables utilized in conventional gaming devices, with the inclusion of an additional outcome corresponding to at least one of the random numbers stored therein. Such a structure allows implementation of embodiments of the present invention with minimized modifications to the program and operations of a gaming device.

For example, a conventional gaming device is typically programmed to determine a random number, identify the outcome in a probability database that corresponds to the random number, and output the identified outcome. In implementing embodiments of the present invention, the gaming device may still determine a random number and look up the random number in a database. However, if more than one outcome corresponds to the random number (as may be possible in the present invention), then the gaming device may output both outcomes (e.g., in a specified order) that correspond to the random number. Further, the data structure of tabular representation 700 allows efficient and quick determination of both an apparent outcome and an actual outcome for a game, without the need for additional determinations (e.g., of a characteristic for an actual or apparent outcome) and processes for determining a second outcome (e.g., an apparent outcome if an actual outcome has already been determined based on a random number) based on, for example, an iterative method.

Accordingly, use of the tabular representation 700 minimizes the amount of processing power, programming, and data storage (e.g., no need to store characteristics and processes for determining an actual or apparent outcome based on the characteristic) necessary for implementation of embodiments of the present invention. Consequently, in accordance with one or more embodiments of the present invention, a computer readable medium (e.g., the memory 310) stores data accessible by a data processing system (e.g. by the processor 305 of gaming device 300 or by another device), the data being organized according to a data structure that includes (i) a first data object representing at least one number, and (ii) a plurality of indicia data objects, each indicia data object corresponding to the first data object, and each representing a set of indicia. Each set of indicia may consist of a predetermined number of indicia and represent an outcome of a game (e.g., playable on a gaming device 230). In one or more embodiments, the data structure may further include a third data object corresponding to one of the plurality of indicia data objects, the third data object representing a payout.

In one or more embodiments, a portion of an outcome (e.g., one reel position of a slot machine outcome) may be changed, thus changing an outcome from an apparent outcome to an actual outcome. In such embodiments, a database may store an indication of one or more indicium to be included in an apparent outcome and an actual outcome, rather than storing an indication of the entire apparent outcome and the entire actual outcome. For example, assume the third reel in a three reel slot machine (or the third hand position in a video poker game) is the designated outcome portion that is to differentiate an apparent outcome and an actual outcome. A probability table may thus store an indication of what indicium is to be displayed in that third reel position as part of an apparent outcome (e.g., bar) and what indicium is to be displayed in that third reel position as part of an actual outcome (e.g., bell).

In accordance with one or more embodiments, a computer readable medium (e.g., memory 310) stores data accessible by a data processing system (e.g., by the processor 305 of gaming device 300 or by another device), the data being organized according to a data structure that includes (i) a first plurality of data objects, each representing a range of numbers, (ii) a second plurality of data objects, each representing one set of indicia and each respective second data object corresponding to one respective first data object, (iii) a third plurality of data objects, each representing a range of numbers, and (iv) a fourth plurality of data objects, each representing two sets of indicia and each respective fourth data object corresponding to one respective third data object. Each set of indicia in this data structure consists of a predetermined number of indicia and represents an outcome for a game (e.g., of a gaming device 300).

In accordance with one or more embodiments of the present invention, a method comprises (i) determining a random number from a random number generator, (ii) accessing the computer readable medium described immediately above, (iii) displaying, if the random number is included in one of the ranges of the first plurality of data objects, the one set of indicia that is represented by one of the plurality of second data objects that corresponds to the range in which the random number is included; (iv) displaying, if the random number is included in one of the ranges of the third plurality of data objects, a first set of indicia of the at least two sets of indicia represented by the one of the fourth plurality of data objects that corresponds to the range in which the random number is included, and (v) displaying a second set of indicia of the at least two sets of indicia represented by the fourth plurality of data objects that corresponds to the range in which the random number is included.

In accordance with one or more embodiments, a gaming device (e.g., gaming device 300) may comprise a processor (e.g., processor 305) and a computer-readable medium such as the one used in the method described immediately above. The gaming device may further comprise a second computer-readable medium (e.g., memory 310). The second computer readable medium may be operative to direct the processor (e.g., processor 305) to retrieve the first plurality of data objects, the second plurality of data objects, the third plurality of data objects, and the fourth plurality of data objects. Note that the computer readable medium used in the method described immediately above and the second computer readable medium may comprise a single medium (e.g., hard drive, RAM, ROM, or another kind of volatile or non-volatile memory).

Figure 7B:
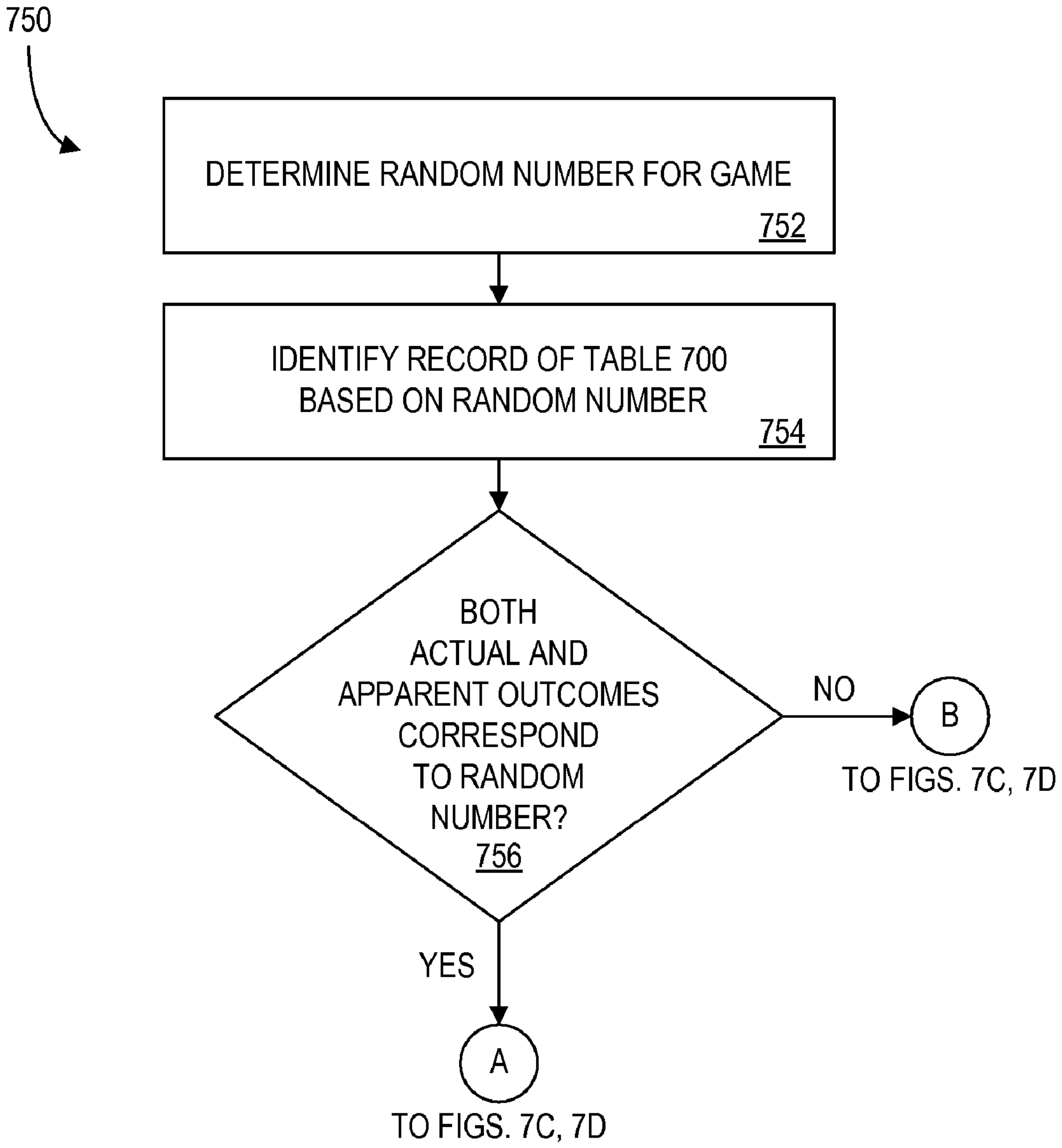
FIG. 7B is a flowchart illustrating a process that utilizes the table of FIG. 7A, consistent with at least one embodiment of the present invention.

Referring now to FIG. 7B, a process 750 illustrates a method for determining an apparent and/or actual outcome for output for a game on a gaming device. The process 750 utilizes the probability database 700 depicted in tabular representation 700 (FIG. 7B), consistent with one or more embodiments of the present invention.

In step 752, a random number is determined for a game initiated on a gaming device. The random number may be determined in any of the variety of manners described herein.

In step 754, the record of the tabular representation 700 that stores the random number is determined. In step 756 it is determined whether both an apparent outcome and an actual outcome correspond to the random number. If both do, the process 750 continues to connector A (continued in FIG. 7C and FIG. 7D). If both do not, the process 750 continues to connector B (continued in FIG. 7C and FIG. 7D).

Figure 7C:
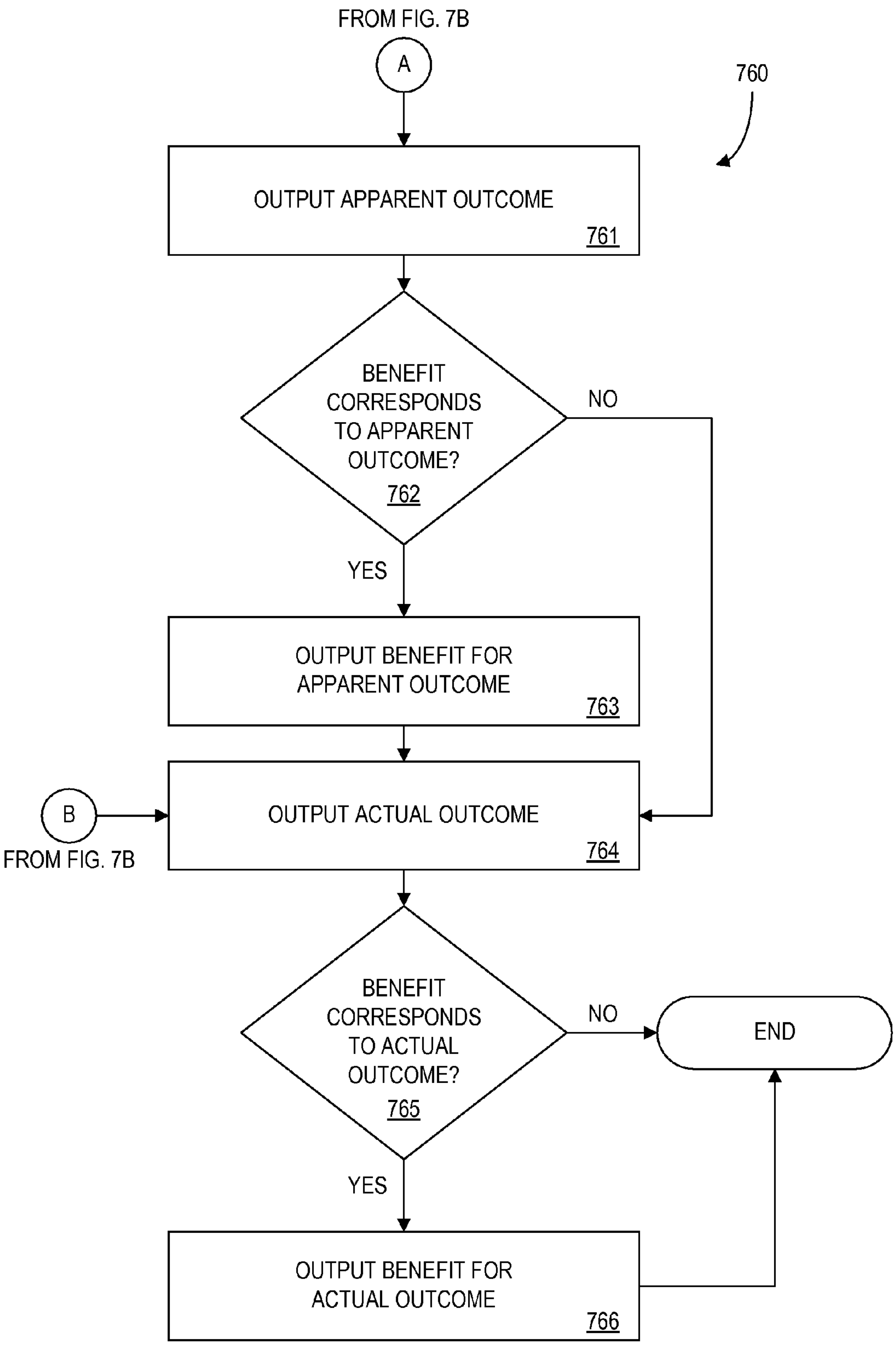
FIG. 7C is a flowchart illustrating a process consistent with at least one embodiment of the present invention.

Referring now to FIG. 7C, a process 760 illustrates a method that is a continuation of process 750, in accordance with some embodiments of the present invention. Connector A continues the process 750 from step 756. Thus, if it is determined in step 756 that both an apparent outcome and an actual outcome correspond to the random number determined in step 752, the apparent outcome is output in step 761.

In step 762, it is determined whether a benefit corresponds to the apparent outcome that was output in step 761. For example, a payout database may be accessed to determine whether a payout corresponds to the one or more indicia comprising the apparent outcome. If a benefit does correspond to the apparent outcome, the benefit is output in step 763. For example, if the apparent outcome corresponds to a payout, the payout is output by coins being dispensed from a hopper into a coin tray of the gaming device or a credit meter balance of the gaming device being increased based on the amount of the payout. The process 760 then continues to step 764.

In step 764 (which continues either from step 763 or from step 756 of process 750), the actual outcome for the game is output. For example, if in step 756 of process 750 it is determined that both an apparent outcome and an actual outcome do not correspond to the random number, then the actual outcome (since at least an actual outcome corresponds to a random number) is output. Record R-706 illustrates a random number that corresponds to an actual outcome but not an apparent outcome.

In step 765 it is determined whether a benefit corresponds to the actual outcome that was output in step 764. If no benefit corresponds to the actual outcome, then the process 760 ends. If, however, a benefit does correspond to the actual outcome then that benefit is output in step 766, after which the process 760 may end. Outputting such a benefit may comprise, for example, outputting a payout in a manner similar to that described with respect to step 763.

Note that the step 766 of outputting a benefit that corresponds to the actual outcome may comprise (i) outputting the entire benefit that corresponds to the actual outcome, or (ii) outputting a portion of the benefit that is the difference between the entire benefit that corresponds to the actual outcome less the benefit that corresponds to the apparent outcome and that was output in step 763. For example, assume that a payout of twenty (20) coins corresponds to an apparent outcome and that this benefit it output to the player in step 763. Further assume that a benefit of fifty (50) coins corresponds to the actual outcome. In one embodiment, the step 766 may comprise outputting the entire fifty (50) coins in addition to the twenty (20) coins that had been output in step 763. In such an embodiment, the player receives a total payout of seventy (70) coins for the apparent and actual outcomes. In another embodiment, the step 766 may comprise outputting only an additional thirty (30) coins (the difference between the fifty (50) coin payout corresponding to the actual outcome and the twenty (20) coin payout already output to the player in step 763). In such an embodiment, the player receives a total payout of fifty (50) coins for the apparent and actual outcomes. Note that this is the same payout the player would have received if no apparent outcome had been output, and only the actual outcome corresponding to the fifty (50) coin payout had been output. Such an embodiment may be used (e.g., in conjunction with the process 100C), to maintain the house edge of the casino as if only a conventional method of outputting outcomes were utilized.

Figure 7D:
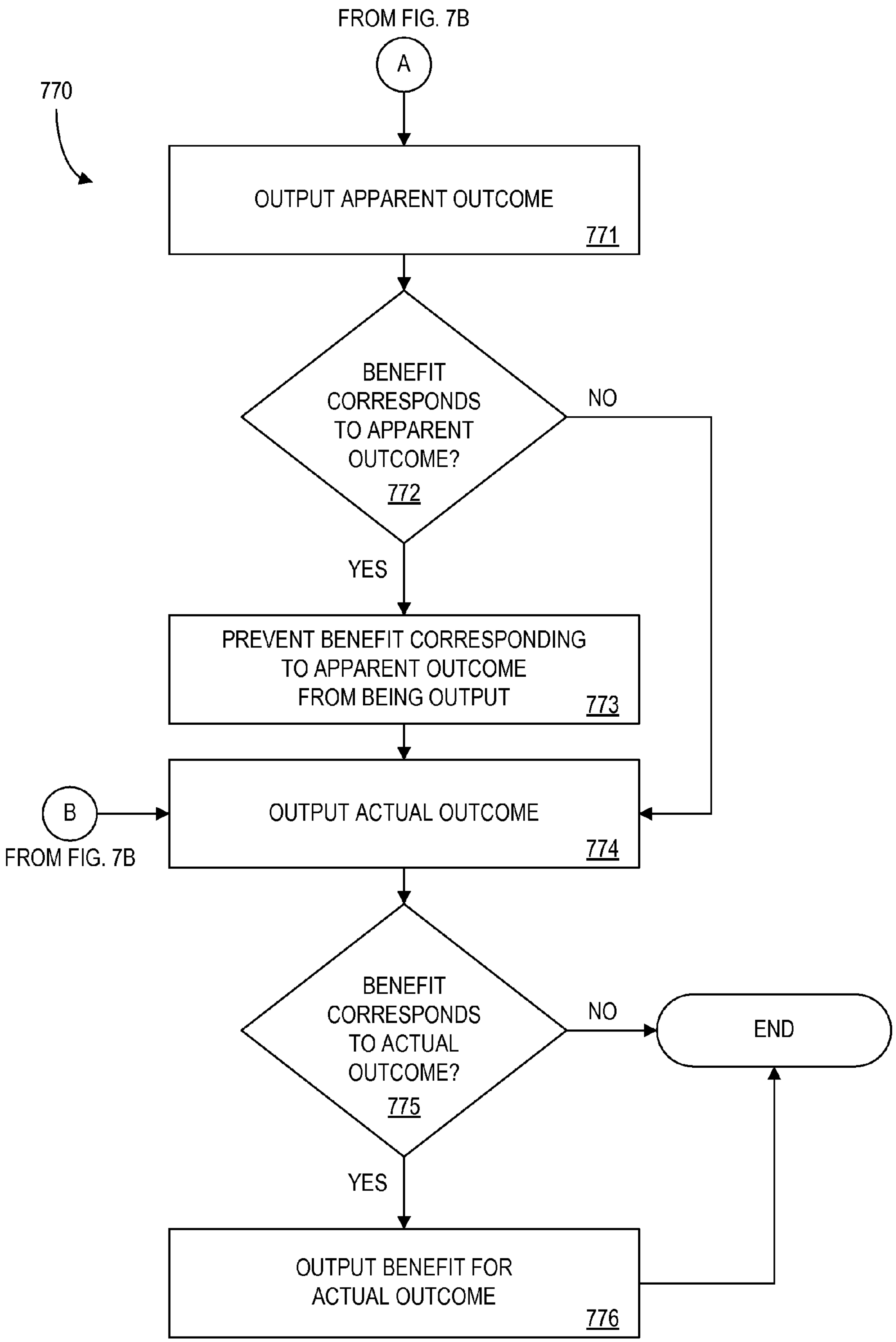
FIG. 7D is a flowchart illustrating a process consistent with at least one embodiment of the present invention.

Referring now to FIG. 7D, a process 770 illustrates another method for continuing the process 750. In step 771, if it is determined in step 756 that both an apparent outcome and an actual outcome correspond to the random number determined in step 752, the apparent outcome corresponding to the random number is output.

In step 772 it is determined whether a benefit corresponds to the apparent outcome. For example, a payout database may be accessed to determine whether a payout corresponds to the one or more indicia comprising the apparent outcome. If a benefit does correspond to the apparent outcome, the process 770 continues to step 773.

In step 773 any benefit that corresponds to the apparent outcome is prevented from being output. Accordingly, for example, if it is determined that the apparent outcome corresponds to a payout greater than zero in a payout database (e.g., "cherry-cherry-bar" corresponds to a payout of five (5) coins in the payout database 650), the gaming device processor may prevent the hopper controller from instructing the hopper to dispense an amount of coins into the coin tray of the gaming device or from the credit meter balance of the gaming device from being increased. Normally, the program of a gaming device instructs the processor of the gaming device to provide any payout that corresponds to an outcome by, for example, either instructing the hopper controller to direct the hopper to dispense coins or by increasing the credit meter balance of the gaming device for the appropriate amount. However, in accordance with one or more embodiments of the present invention, such instructions of the program may be overridden if the outcome is an apparent outcome. For example, a peripheral device in communication with a gaming device may instruct the processor of the gaming device to not output the payout that corresponds to the apparent outcome.

In other embodiments, the program being executed by the processor may instruct the processor to only output a benefit (e.g. a payout) if the outcome corresponding thereto is an actual outcome and to not output the benefit (e.g., payout) if the outcome corresponding thereto is an apparent outcome. In such embodiments there would be no need for a step of preventing the output of the benefit.

In yet other embodiments, the benefit corresponding to an apparent outcome may be output under certain circumstances and not in others. In such embodiments, the process 770 may include an additional step of determining whether the outcome for the apparent outcome should be output.

In step 774, the actual outcome is output. Step 774 is performed after (i) step 773, (ii) step 772 (if it had been determined therein that a benefit does not correspond to a benefit), or (iii) step 756 of process 750 (if it had been determined therein that an actual and apparent outcome do not both correspond to the random number determined in step 752). The actual outcome may be output in any of the variety of manners of outputting an outcome described herein.

In step 775 it is determined whether a benefit corresponds to the actual outcome. If no benefit corresponds to the actual outcome, the process 770 may end and the game device may thus be ready for initiation of another game. If it is determined that a benefit does correspond to the actual outcome, the benefit is output in step 776, after which the process 770 ends.

Referring now to FIG. 8A, an exemplary tabular representation 800 illustrates an embodiment of a method of output database 330 (FIG. 3), in accordance with one or more embodiments of the present invention. The tabular representation 800 of the method of output database includes a number of example records or entries, each defining a method for outputting an outcome of a game on a gaming device. Those skilled in the art will understand that the method of output database may include any number of entries. The tabular representation 800 also defines fields for each of the entries or records. The fields specify: (i) a random number 810 that stores a range of random numbers that may be generated or obtained by a gaming device, and (ii) a method for displaying outcome 820 that stores a description of how the outcome for a game is to be output.

Note that, although the methods described in tabular representation 800 are ones that involve an apparent outcome, an actual outcome, or both (in accordance with embodiments of the present invention), other methods may be depicted. For example, one stored method may comprise outputting an outcome visually (e.g., by displaying it on a display area of the gaming device) and another method may comprise outputting the outcome via an audio signal. In another example, a method may comprise utilizing a particular character that appears to change the apparent outcome to the actual outcome.

Figure 8B:
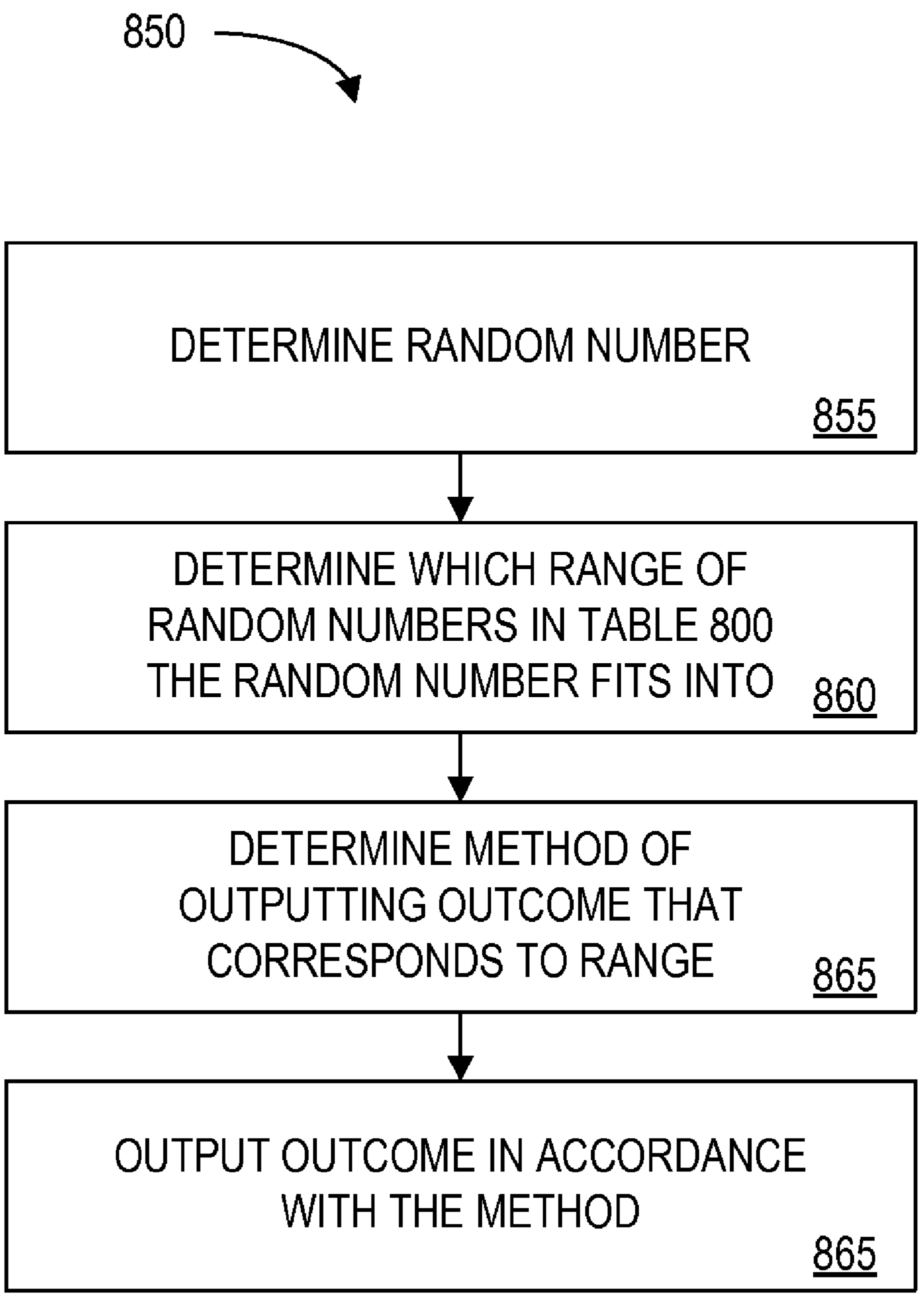
FIG. 8B is a flowchart illustrating a process that utilizes the table of FIG. 8A, consistent with at least one embodiment of the present invention.

Referring now to FIG. 8B, a flowchart illustrates a process 850. The process 850 is a process for determining which method of a plurality of available methods to utilize for outputting an outcome of a game, wherein the methods are those stored in tabular representation 800. In step 855, a random number is determined. The random number may be determined in any of the variety of manners described herein. The random number may be the same random number as determined for purposes of determining an outcome for a game or may be a different number.

The table 800 is accessed in step 860 to determine which of the plurality of ranges the random number fits in. Once the range is determined, the method that corresponds to that range is determined in step 865. In step 870, the outcome is output in accordance with the determined method.

An example utilizing table 700 (FIG. 7A) and table 800 (FIG. 8A) follows, to help illustrate one or more embodiments of the present invention. Assume a player initiates a game on a gaming device and the random number "00113" is obtained. Table 700 may be accessed to determine what set of indicia to display as an actual outcome and what set of indicia, if any, to display as an apparent outcome. Record R-702 indicates that the random number "00113" corresponds to an apparent outcome "7/Bell/Bell" and an actual outcome "Bar/Bell/Bell". Another random number is determined for purposes of determining the method of displaying the outcome for the game. As described above, in one or more embodiments, the same random number that was generated for purposes of determining an outcome (e.g., the set of indicia comprising an actual outcome and the set of indicia, if any, comprising an apparent outcome) may be utilized to determine a method for displaying the outcome.

Assume for purposes of this example that a second random number is determined, and that it is "03229". Table 800 may be accessed to determine what method corresponds to this random number. Record R-802 indicates that "03229" fits into the range of "00001-04000". Record R-802 also indicates that the method that corresponds to this range, and therefore to the determined random number "03229" comprises outputting only an actual outcome. Accordingly, the outcome "Bar/Bell/Bell" is output on the gaming device and the apparent outcome "7/Bell/Bell" is not output.

Assume, instead, that the second random number that was determined was "05009". As record R-804 of table 800 illustrates, that random number falls into the range "04000-09000" and the method that comprises outputting an apparent outcome and, three seconds later, outputting an actual outcome. If, for the game of this example, the random number "05009" had been determined, outputting the outcome would comprise outputting "7/Bell/Bell" first and then, three seconds later, outputting "Bar/Bell/Bell" as the actual outcome of the game. Assuming that the gaming device utilizes the payout schedule illustrated in table 650, it should be noted that "7/Bell/Bell" does not correspond to any payout but that "Bar/Bell/Bell" corresponds to a payout of 18 coins or electronic credits.

In one or more embodiments, the process 850 may continue into process 100B or process 100C. For example, assuming that (if a method indicates that both an apparent outcome and an actual outcome are to be output), the gaming device may utilize process 100A to determine the apparent and actual outcome for output. In such embodiments, a random number for determining a method of outputting an outcome may first be determined and the random number utilized for determining an outcome may be determined second. Alternatively, both the random numbers may be determined substantially simultaneously, in reverse order, or the same number may be utilized for both purposes.

Referring now to FIG. 9, an exemplary tabular representation 900 illustrates an exemplary embodiment of a character database 335 (FIG. 3) that may be stored in gaming device 300. The tabular representation 900 of the character database includes a number of example records or entries, each defining a character that may be displayed on a gaming device and/or a peripheral device associated with a gaming device. Those skilled in the art will understand that the character database may include any number of entries. The tabular representation 900 also defines fields for each of the entries or records. The fields specify: (i) a character identifier 910 that uniquely identifies a character, (ii) a character title 920 that indicates a succinct description of the character, that may be used to refer to the character (e.g. when displaying or promoting the character to a player), and (iii) a description 930 of the character. Note that a data file or pointer to a data file of an image of the character or a code for displaying an animation of the character may also be stored in tabular representation 900.

A character may comprise, for example, an animated character or an image of a celebrity or other person. The character database may also store one or more audio files in association with a character. Such sound files may be used for example, to output message to the player as if they were spoken by the character or as sound effects that are played when the character is displayed.

The character database may be accessed by a gaming device, for example, to select a character to display to a player. Such a selection may be based on one or more rules. For example, a player may prefer a particular character and this preference may be stored in association with a player's identifier. Accordingly, a character may be selected from the character database based on the identifier associated with the player playing the gaming device (e.g., as read from a player tracking card inserted into the gaming device). In one or more embodiments, a player may be presented with a choice of characters available in the database (e.g., at the beginning of a gaming session at a particular gaming device or visit to a casino or when registering as a member of a slot club at a casino). In such embodiments, some of the information in the character database may be displayed to the player (e.g., the title and description of the character may be displayed) at a gaming device and the player may select a character.

In one or more embodiments, only one character may be associated with a particular gaming device. In such embodiments, the character database may store only a single entry.

Note that, although the character database is depicted in FIG. 3 as being stored in a gaming device 300, in one or more embodiments the database or the data therein may be stored in a peripheral device 240 (or another device) in addition to or in lieu of being stored in a gaming device 300.

Referring now to FIG. 10, an exemplary tabular representation 1000 illustrates an exemplary embodiment of a player database 425 (FIG. 4) that may be stored in computer 400. The tabular representation 1000 of the player database includes a number of example records or entries, each defining a player who may be a member of a slot club of a casino or otherwise registered with or known to a casino or other entity. Those skilled in the art will understand that the player database may include any number of entries. The tabular representation 1000 also defines fields for each of the entries or records. The fields specify: (i) a player identifier 1010 that uniquely identifies a player, (ii) a name 1020 of a player, (iii) a financial account identifier 1030 associated with a player, (iv) an indication of comp points 1040 available to a player, (v) a theoretical win/[loss] 1050, (vi) an actual win/[loss] 1060 for a player, (vii) a hidden account balance 1070, and (viii) an outcome output preference(s) 1080.

The information in the player database 425 may be created and updated, for example, based on information received from a player, a casino employee, a gaming device 230, a peripheral device 240, and/or peripheral device server 245. For example, the information may be created when a player registers with a casino and receives a player tracking card encoded with the player identifier. The information may be subsequently updated when a player requests to update the information (e.g. when a player indicates a desire to change a preferred character or preferred method of outputting an outcome) or when additional information is obtained about the player via the casino's interactions with the player (e.g. the lifetime theoretical win may be updated on an ongoing basis as the player plays games at a casino).

The player identifier 1010 may be, for example, an alphanumeric code associated with a player who may operate a gaming device or play a table game at a casino. The player identifier 1010 may be generated or selected, for example, by the computer 210 or by the player (e.g., when a player first registers with a casino). For each player, the player database 425 may also store the player's name 1020 (e.g., for use in outputting messages to the player). In one or more embodiments the player's name may comprise a nickname or other designation for the player that is selected by the player or the casino. In one or more embodiments, the nickname may comprise a designation that reflects the player's status (e.g., "premium player"). Such a status may indicate, for example, the typical spending range of the player or other indication of how valuable the player is considered to be by the casino. Such a designation may or may not be known to the player.

The financial account identifier 1030 (e.g., a credit card account number, a debit card account number, a checking account number, a casino financial account number, or digital payment protocol information) associated with the player. The financial account identifier 1030 may be used, for example, to credit a payment to the player (e.g., wherein a benefit obtained by the player comprises a monetary amount) and/or to debit a wager amount.

The comp points 1040 stores an indication of the number of comp points that a player is currently entitled to. Comp point programs are a common method for a casino to reward players by awarding points to players as a reward for certain gambling behavior that a casino finds desirable. Although the comp points programs differ from casino to casino, in a typical comp point program a player accumulates comp points based on (i) a total amount of coins wagered, or (ii) a total amount of coins paid out. Alternatively, comp points may be awarded based on, for example, (i) the length of time or a number of game plays at a gaming device or table game; (ii) the average wager of a player; and/or (iii) for playing a particular gaming device or group of gaming devices. As the player accumulates comp points the player may exchange some or all of the comp points for goods or services specified by the comp point program. For example, a player may exchange 1000 comp points for a dinner at a casino restaurant. As the player exchanges comp points for a good or service the exchanged comp points are deducted from the player's comp point balance reflected in field 1040 of tabular representation 1000. In some comp point programs the rewards are defined in terms of dollar amounts rather than points. In yet other comp point programs the points are exchangeable into dollar amounts based on a schedule defined by the casino, allowing the player to convert the accumulated points into dollar amounts and then use the dollar amounts to purchase goods or services from the casino.

The theoretical win/[loss] 1050 stores an indication of the theoretical win of the player based on the playing activity of the player since the playing activity of the player has been tracked. In other words, the historical theoretical win/[loss] 1050 may be a "lifetime" theoretical win. In other embodiments a historical theoretical win/[loss] based on other periods of time may be stored in addition to or instead of the lifetime historical theoretical win/[loss]. For example, an annual or session theoretical win/[loss] may be stored. The actual win/[loss] 1060 stores an indication of the actual dollar amount that the corresponding player has won or lost while gambling at the casino. A loss is indicated in brackets in the tabular representation 1100.

In some embodiments of the present invention, a determination of whether to output both an apparent outcome and an actual outcome for a game may be based on the theoretical win/[loss] and/or actual win/[loss] of the player playing the game. For example, using the process 100B, that in step 130 it is determined that two predetermined conditions have been satisfied: (i) that a player's actual win/[loss] is a loss of at least a predetermined value (assuming, for this example, that the win/[loss] is calculated for a particular gaming session); and (ii) that the outcome determined based on the random number corresponds to a payout that is not greater than zero. Satisfaction of these two predetermined conditions may correspond to a characteristic for an actual outcome that comprises the correspondence of the actual outcome to a payout that either is at least a first predetermined amount or would result in the player's actual win/[loss] becoming a positive value of at least a second predetermined amount. Accordingly, the gaming device in this example may determine an actual outcome that satisfies this alternative characteristic.

It should be understood that although a player identifier and information related to each registered player is described in detail, a player need not be registered in order to be provided with both an apparent outcome and an actual outcome for a game or to benefit from other embodiments of the present invention. Accordingly, registration of a player and storing of information related to a player is not necessary for practice of the present invention.

The hidden account balance 1070 stores a monetary amount that is available for funding payouts to the player with whom a respective hidden account balance is associated. In accordance with one or more embodiment of the present invention, a portion of a player's wager amounts or a portion of payouts obtained by the player may be deducted and added to a hidden account balance associated with the player. In one or more embodiments, a casino may add funds to the hidden account associated with a player in response to certain desired gambling or other behavior exhibited by the player. For example, 0.5% of each wager placed by a player may not go towards funding the game at the particular gaming device the player is playing but may instead be added to the hidden account associated with the player. A player may or may not be aware of such a practice and/or of the existence of such a hidden account. Such a hidden account may be used, for example, to fund an actual outcome to be output to a player. In other words, any payout corresponding to an apparent or actual outcome output to a player may be deducted from the player's hidden account balance. This may be particularly true if such an apparent or actual outcome is determined based on a characteristic (e.g., consistent with process 100B or 100C), rather than being determined based on a random number in conventional play.

For example, referring again to FIG. 1B, in the process 100B an actual outcome is determined based on a characteristic if a predetermined condition is satisfied. Assume that, in an example, two predetermined conditions have been satisfied: (i) the player has not obtained an actual outcome that corresponds to a payout in at least one hour of consecutive play, and (ii) the outcome determined in step 125 (based on a random number) also does not correspond to a payout. Further assume that the characteristic for the actual outcome determined in step 145 corresponds to a payout of at least five coins or electronic credits.

Funding a payout that corresponds to an actual outcome that was determined in a manner that results in a payout to the player in addition to the expected payouts included in a house edge calculation may not be desirable to a casino. Providing such a payout may lower the house edge because it comprises paying money out to a player in addition to the expected payouts that are determined in accordance with the probability table. Paying such amounts out on a regular basis (e.g., to each player whose game play satisfies the above two conditions) may significantly and unacceptably lower the house edge. It is noted that, in some circumstances, a casino may be willing to make such payments. For example, the casino may consider the payments as part of its marketing or customer retention budget since it may result in the player being willing to play longer or being more willing to return to the casino. However, some casinos may be reluctant to fund such payouts. Accordingly, a hidden account may be established for a player and payouts for some apparent or actual outcomes funded with the amount stored in the hidden account. In such embodiments, before an actual or apparent outcome that is to be funded with such an account is determined, a determination may first be made of whether the hidden account contains an amount sufficient to fund the corresponding payout.

Hidden accounts and methods for establishing and utilizing them are described in more detail in co-pending, commonly-owned U.S. Provisional Application Ser. No. 60/373,747. This Application is incorporated by reference herein for all purposes.

The outcome output preference(s) 1080 store one or more preferences for a method of outputting an outcome (actual and/or apparent) to a player. For example, a preference may be that a player prefers to have both an actual and apparent outcome displayed for a game or a particular character that a player prefers to have displayed. Such player preferences may be provided by the player directly (e.g., a player may tell a casino employee, who may in turn enter an indication of the preference to the player database). Alternatively, a player preference may be determined indirectly. For example, a casino employee may observe a player's reaction and decide that the player really does not like to have both an actual and apparent outcome output or that a player really enjoys a particular character displayed. In another example of how a player preference may be determined indirectly, a player's gambling behavior may be tracked to determine whether a player continues to keep playing for an extended period of time or stops playing shortly after a particular method of outputting an outcome is used (e.g., a particular character is displayed).

Referring now to FIG. 11, an exemplary tabular representation 1100 illustrates one embodiment of the gaming device database 430 (FIG. 4) that may be stored in the computer 400. The tabular representation 1100 of the gaming device database includes a number of example records or entries, each defining a gaming device that may be in communication (e.g. over a LAN or WAN) with computer 400. Those skilled in the art will understand that the gaming device database may include any number of entries. The tabular representation 1100 also defines fields for each of the entries or records. The fields specify: (i) a gaming device identifier 1110 that uniquely identifies a particular gaming device (e.g., uniquely identifies a particular slot machine on a casino floor or a PC communicating with an online casino), (ii) a gaming device type 1120 that stores a description or designation of the type of gaming device, (iii) a gaming device location 1130, and (iv) an outcome output capability.

The gaming device database may be used by computer 400 to, for example, communicate with one or more gaming devices and to identify a gaming device that data is being transmitted to or received from. For example, the computer 400 may instruct a gaming device as to which method of output to use, transmit a random number to the gaming device, transmit an indication of a character for use by the gaming device, update information in one or more databases of the gaming device, and receive information associated with a player of the gaming device (e.g., a player identifier, player preferences, an indication of wagers placed or number of games played by a player, an indication of duration of play by a player at the gaming device, etc.). Some of this information may be stored in association with the gaming device. For example, the gaming device may store an indication of the last time that both an actual and apparent outcome were output for a game on a particular gaming device.

The gaming device location 1130 stores an indication of where a particular gaming device is located. Such information may be used, for example, to determine whether both an actual and an apparent outcome should be output as a result of a game on a gaming device. For example, in one embodiment it may be desirable that both an actual and apparent outcome be output for a game on one gaming device in a designated area of a casino per predetermined period of time (e.g., at least once every five minutes for a particular bank of slot machines). Accordingly, the computer 400 may track when both an actual and apparent outcome is output on a particular device and, if this has not occurred within a predetermined period of time in a designated area of a casino, the computer 400 may select a gaming device in that area and instruct it to output both an apparent outcome and an actual outcome for the next game played.

The outcome output capability 1140 stores an indication of the capability of the gaming device to output an outcome. For example, not all of the gaming devices in communication with computer 400 may be capable of outputting both an actual and an apparent outcome for a game. Note, for example, that the gaming device "G-20-0013-55" of record R-1102 is capable of outputting an actual outcome only. This device may comprise, for example, a gaming device that operates in a conventional manner. Accordingly, if computer 400 determines that a gaming device in location "casino 1, area C-1" should be instructed to output both an actual and apparent outcome for a game, the computer 400 would not select gaming device "G-20-0013-55" to communicate instructions to. Computer 400 may instead select gaming device "G-20-9981-03" to communicate instructions directing the gaming device to output both an actual and apparent outcome, since record R-1103 indicates that gaming device "G-20-9981-03" is capable of outputting both an actual and apparent outcome. Note, however, that record R-1103 indicates that gaming device "G-20-9981-03" is capable of outputting both an actual and apparent outcome via a peripheral device "PD-999-01". Accordingly, computer 400 may communicate the instructions to peripheral device "PD-999-01" directly, to peripheral device server 245 (which may, in turn communicate the instructions to the peripheral device), or to gaming device "G-20-9981-03" (which may, in turn, communicate the instructions to the peripheral device).

Figure 12:
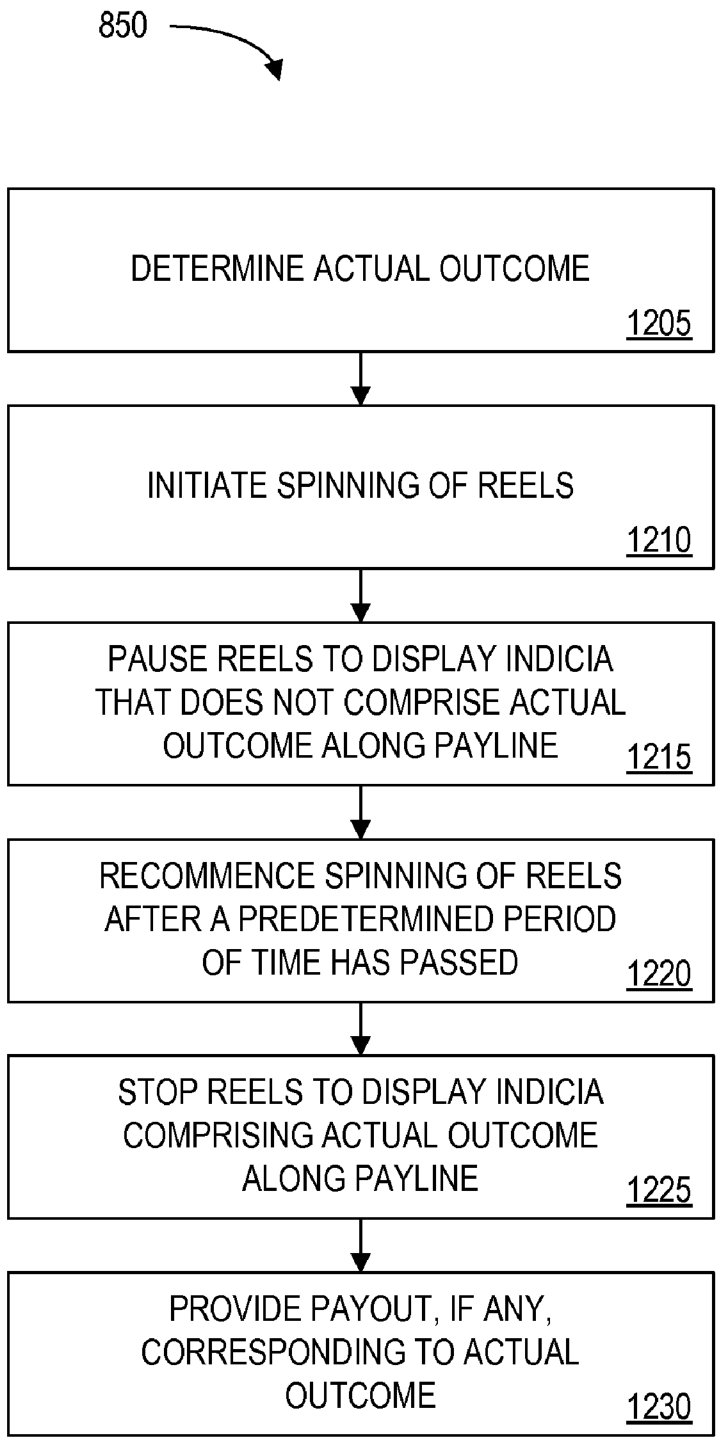
FIG. 12 is a flowchart illustrating a process for outputting an outcome on a gaming device, consistent with at least one embodiment of the present invention.

Referring now to FIG. 12, a flowchart illustrates a process 1200 that is consistent with one or more embodiments of the present invention. The process 1200 is a method for outputting both an apparent outcome and an actual outcome for a game of a gaming device. For illustrative purposes only, the process 1200 is described as occurring on a reeled slot machine. Of course, the process 1200 may be adjusted for any type of gaming device (e.g., video poker, video blackjact, etc.).

In step 1205 an actual outcome is determined. The actual outcome may be determined in a variety of manners. For example, a random number may be determined and a probability database accessed to determine what outcome corresponds to the random number. The probability database may be, for example, a prior art probability database (such as illustrated in FIG. 6A.

In step 1210, the spinning of the reels of the gaming device 1210 is initiated. For example, mechanical reels may be set in motion or electronic reels may be displayed in simulated motion. In step 1215 the reels are paused to display indicia that does not comprise the actual outcome along a payline of the gaming device. The position of the reels and what indicia is displayed along the payline may be determined randomly or based on one or more rules. For example, the reels may be paused a predetermined time from a time at which the spinning of the reels was initiated (e.g., 1.5 seconds). Thus, in accordance with one or more embodiments, the gaming device may not determine what apparent outcome (i.e., what particular indicia are to comprise an apparent outcome) and then display the determined outcome. Instead, the gaming device may pause the reels at a particular time, without regard as to the indicia that is displayed along the payline at the moment the reels are paused. The gaming device may, however, pause the reels such that indicia are displayed along the payline and avoid having the reels paused such that the payline appears between symbols.

In step 1220, the spinning of the reels is recommenced, after a predetermined period of time from the time at which the reels were paused (e.g., 1 second). In other embodiments, the recommencement of the spinning of the reels may be triggered by conditions other than the passage of a predetermined period of time. For example, a signal from the player, a casino employee, or computer 400 may cause the spinning of the reels to be recommenced. As in some other embodiments, if a payout corresponds to the indicia displayed along the payline during the pause of the reels, such payout may or may not be provided to the player.

In step 1225 the reels are stopped such that the actual outcome is displayed along the payline of the gaming device. Finally, in step 1230, any payout that corresponds to the actual outcome is provided after the actual outcome is output.

It should be noted that, similar to the determinations in process 100B and process 100C, process 1200 may include a determination of whether the reels should be paused and an apparent outcome output or whether just the actual outcome should be output. Such a determination may be based, for example, on a determination of whether a predetermined condition has been satisfied. Such a predetermined condition may comprise a condition similar to those described with respect to step 130 of process 100B or step 170 of process 100C.

In conclusion, while the methods and apparatus of the present invention have been described in terms of particular embodiments, those skilled in the art will recognize that the present invention may be practiced with modification and alteration without departing from the teachings disclosed herein.

What is claimed is:

1. A method comprising:

causing at least one processor to execute a plurality of instructions stored on a memory device to determine an outcome value of a play of a wagering game at a gaming device;

causing the at least one processor to execute the plurality of instructions to determine a method for displaying the outcome value at the gaming device by selecting a display method from a plurality of potential display methods associated with the outcome value, the plurality of potential display methods include at least: (i) displaying only the determined outcome value, (ii) displaying an apparent outcome value and then displaying the determined outcome value, and (iii) displaying the determined outcome value, then displaying the apparent outcome value, and then displaying the determined outcome value again, wherein selecting the display method occurs after the determination of the outcome value; and causing the at least one processor to execute the plurality of instructions to cause a display device to display the determined outcome value of the play of the wagering game using the selected display method.

2. The method of claim 1 wherein selecting the display method occurs during the play of the wagering game at the gaming device.

3. The method of claim 1 wherein causing the at least one processor to execute the plurality of instruction to determine the method for displaying includes causing the at least one processor to execute the plurality of instruction to generate a first random number.

4. The method of claim 3 wherein causing the at least one processor to execute the plurality of instruction to determine the outcome value includes causing the at least one processor to execute the plurality of instruction to generate a second random number distinct from the first random number.

5. The method of claim 1 wherein causing the at least one processor to execute the plurality of instruction to determine the outcome value includes causing the at least one processor to execute the plurality of instruction to generate a random number and wherein causing the at least one processor to execute the plurality of instruction to determine the method for displaying includes causing the at least one processor to execute the plurality of instruction to reuse the random number.

6. The method of claim 1 wherein causing the at least one processor to execute the plurality of instruction to determine the method for displaying includes causing the at least one processor to execute the plurality of instruction to reference a computer memory.

7. The method of claim 6 wherein causing the at least one processor to execute the plurality of instruction to reference the computer memory includes causing the at least one processor to execute the plurality of instruction to reference a database within the computer memory.

8. A method comprising:

receiving a request to initiate a play of a wagering game at a gaming device;

causing at least one processor to execute a plurality of instructions stored on a memory device to determine an outcome value of the play of the wagering game at the gaming device;

causing the at least one processor to execute the plurality of instructions to determine a method for displaying the outcome value at the gaming device by selecting a display method from a plurality of potential display methods associated with the outcome value, the plurality of potential display methods include at least: (i) displaying only the determined outcome value, (ii) displaying an apparent outcome value and then displaying the determined outcome value, and (iii) displaying the determined outcome value, then displaying the apparent outcome value, and then displaying the determined outcome value again, wherein selecting the display method occurs after the initiation of the play of the wagering game; and causing the at least one processor to execute the plurality of instructions to cause a display device to display the determined outcome value of the play of the wagering game using the selected display method.

9. A gaming device comprising:

a user interface; and a control system operatively coupled to the user interface and configured to:

determine an outcome value of a play of a wagering game at the gaming device;

determine a method for displaying the outcome value at the gaming device by selecting a display method from a plurality of potential display methods associated with the outcome value, the plurality of potential display methods include at least: (i) displaying only the determined outcome value, (ii) displaying an apparent outcome value and then displaying the determined outcome value, and (iii) displaying the determined outcome value, then displaying the apparent outcome value, and then displaying the determined outcome value again, wherein selection of the display method occurs after the determination of the outcome value; and cause a display device to display the determined outcome value of the play of the wagering game using the selected display method.

10. A non-transitory computer readable medium comprising software with instructions to:

determine an outcome value of a play of a wagering game at a gaming device;

determine a method for displaying the outcome value at the gaming device by selecting a display method from a plurality of potential display methods associated with the outcome value, the plurality of potential display methods include at least: (i) displaying only the determined outcome value, (ii) displaying an apparent outcome value and then displaying the determined outcome value, and (iii) displaying the determined outcome value, then displaying the apparent outcome value, and then displaying the determined outcome value again wherein selection of the display method occurs after the determination of the outcome value; and cause a display device to display the determined outcome value of the play of the wagering game using the selected display method.

* * * * *

UNITED STATES PATENT AND TRADEMARK OFFICE

CERTIFICATE OF CORRECTION

PATENT NO. : 8,162,735 B2
APPLICATION NO. : 11/942014
DATED : April 24, 2012
INVENTOR(S) : Jay S. Walker et al.

It is certified that error appears in the above-identified patent and that said Letters Patent is hereby corrected as shown below:

IN THE CLAIMS

In Claim 1, Column 39, Line 63, replace “include” with --including--.
In Claim 3, Column 40, Lines 13 and 15, replace “instruction” with --instructions--.
In Claim 4, Column 40, Lines 18 and 20, replace “instruction” with --instructions--.
In Claim 5, Column 40, Lines 23, 25, 27, and 29, replace “instruction” with --instructions--.
In Claim 6, Column 40, Lines 32 and 34, replace “instruction” with --instructions--.
In Claim 7, Column 40, Lines 37 and 39, replace “instruction” with --instructions--.
In Claim 8, Column 40, Line 53, replace “include” with --including--.
In Claim 9, Column 41, Line 9, replace “include” with --including--.
In Claim 10, Column 42, Line 7, replace “include” with --including--.

Signed and Sealed this
Twenty-fourth Day of July, 2012

David J. Kappos
*Director of the United States Patent and Trademark Office*